US011888375B2

(12) United States Patent
Yang et al.

(10) Patent No.: US 11,888,375 B2
(45) Date of Patent: Jan. 30, 2024

(54) ELECTRIC MOTOR FOR OPERATING IN CONDUCTIVE FLUIDS AND RELATED METHOD

(71) Applicant: MS Directional, LLC, Conroe, TX (US)

(72) Inventors: Libo Yang, Houston, TX (US); Akshay Sagar, Houston, TX (US); Peter Nicholas Wells, Houston, TX (US); Scott Patrick Dyas, Houston, TX (US); Haixiao Weng, Houston, TX (US); Aaryan Sagar, Houston, TX (US)

(73) Assignee: MS DIRECTIONAL, LLC, Conroe, TX (US)

( * ) Notice: Subject to any disclaimer, the term of this patent is extended or adjusted under 35 U.S.C. 154(b) by 260 days.

(21) Appl. No.: 17/104,248

(22) Filed: Nov. 25, 2020

(65) Prior Publication Data
US 2021/0175769 A1    Jun. 10, 2021

Related U.S. Application Data

(60) Provisional application No. 62/941,009, filed on Nov. 27, 2019.

(51) Int. Cl.
*H02K 5/10* (2006.01)
*H02K 3/28* (2006.01)
(Continued)

(52) U.S. Cl.
CPC .................. *H02K 5/10* (2013.01); *H02K 3/28* (2013.01); *H02K 3/44* (2013.01); *H02K 5/132* (2013.01); *H02K 5/20* (2013.01); *H02K 2205/09* (2013.01)

(58) Field of Classification Search
CPC .. H02K 5/10; H02K 3/28; H02K 3/44; H02K 5/132; H02K 5/20; H02K 2205/09;
(Continued)

(56) References Cited

U.S. PATENT DOCUMENTS 4,549,105 A * 10/1985 Yamamoto ............. H02K 11/26
310/43
9,494,035 B2    11/2016 Logan et al.
(Continued)

FOREIGN PATENT DOCUMENTS

CA          2024061 C       10/2001
KR        101436254 B1       9/2014
WO       2018183499 A1      10/2018

OTHER PUBLICATIONS

Zavelcuta, F., International Search Report for International Patent Application No. PCT/US2020/062186, dated Mar. 9, 2021, European Patent Office.
(Continued)

*Primary Examiner* — Ahmed Elnakib
(74) *Attorney, Agent, or Firm* — Jackson Walker LLP

(57) ABSTRACT

The present disclosure provides an electrical motor configured to operate with conductive fluids internal to the motor without short-circuiting. One embodiment is a telemetry modulator that can include the electric motor and a valve coupled with the electric motor. The valve has a valve stator and a valve rotor, and the electric motor can be used to control accurately the valve opening and closing with valve rotor rotation. The valve rotor can rotate continuously or in oscillations to generate a continuous pressure wave, such as for MWD/LWD communication. The electric motor is configured to allow drilling mud to flow into the electric motor without short-circuiting by the motor stator and/or motor rotor having an electric motor winding and a termination for the winding, the winding and termination having a noncon-
(Continued)

ductive coating. The electric motor can be used in other applications inside and outside the oil field environment.

29 Claims, 16 Drawing Sheets

(51) Int. Cl.
    *H02K 5/20*         (2006.01)
    *H02K 3/44*         (2006.01)
    *H02K 5/132*       (2006.01)

(58) Field of Classification Search
CPC .. H02K 1/20; H02K 1/32; H02K 3/38; H02K 5/225; H02K 7/14; H02K 9/12; H02K 9/14
USPC .............................................. 310/43, 78–88
See application file for complete search history.

(56) References Cited

U.S. PATENT DOCUMENTS

| | | | |
|---|---|---|---|
| 9,528,371 | B2 | 12/2016 | Liu et al. |
| 9,574,441 | B2 | 2/2017 | Liu et al. |
| 9,631,487 | B2 | 4/2017 | Lee et al. |
| 9,631,488 | B2 | 4/2017 | Lee et al. |
| 9,670,774 | B2 | 6/2017 | Lee et al. |
| 10,161,196 | B2* | 12/2018 | Kirkhope .............. E21B 47/024 |
| 2004/0104821 | A1* | 6/2004 | Clark .................... G01V 11/002 |
| | | | 340/854.6 |
| 2010/0195442 | A1* | 8/2010 | Reyes ..................... E21B 47/20 |
| | | | 367/83 |
| 2014/0042835 | A1 | 2/2014 | Holzmueller et al. |
| 2014/0326509 | A1* | 11/2014 | Hay ...................... E21B 17/003 |
| | | | 175/57 |
| 2015/0034294 | A1 | 2/2015 | Miles et al. |
| 2017/0372813 | A1 | 12/2017 | Parmeter et al. |
| 2018/0045042 | A1 | 2/2018 | Lee et al. |

OTHER PUBLICATIONS

Zavelcuta, F. Written Opinion for International Patent Application No. PCT/US2020/062186, dated Mar. 9, 2021, European Patent Office.
Y. Zhidan, G. Yanfeng, W. Tiannong, W. Chunming, G. Tingzheng, S. Jing, H. Xiufeng, Y. Menglei, "Design of a continuous wave mud pulse generator for data transmission by fluid pressure fluctuation", (Abstract) Flow Measurement and Instrumentation, (Mar. 1, 2018), pp. 28-36, vol. 59, Elsevier Ltd.
R. Ali, M. Clayton; M. Chris, W. Joshua, "Innovative technology to extend EM-M/LWD drilling depth", (Abstract) Society of Petroleum Engineers, (2013), pp. 1404-1413, vol. 2, Society of Petroleum Engineers (SPE).
S. Jones, C. Feddema, J. Sugiura, J. Lightey, "A New Friction Reduction Tool with Axial Oscillation Increases Drilling Performance: Field-Testing with Multiple Vibration Sensors in One Drill String", (Abstract) Society of Petroleum Engineers, (Jan. 2016).
Z. Changqing, L. Kai, C. Xing, "Research on the erosion of valve of positive pulse measurement while drilling and structural improvement", Industrial, (Abstract) Mechanical and Manufacturing Science, (2015), pp. 45-48, CRC Press/Balkema.
T. Zhidan, W. Chumming, G. Yanfeng, S. Jing, H. Xiugeng, L. Yuan, "Design of a rotary valve orifice for a continuous wave mud pulse generator", (Abstract) Precision Engineering, (Jul. 1, 2015), pp. 111-118, vol. 41, Elsevier Inc.

Z. Changqing, L. Kai, Z. Tong, M. Takei, R. Weian, "Investigation on the generation characteristic of pressure pulse wave signal during the measurement-while-drilling process", (Abstract) AIP Conference Proceedings, (Apr. 11, 2014), pp. 341-346, vol. 1592, American Institute of Physics Inc.
A. Al Ali, S. Barton, A. Mohanna, "Unique axial oscillation tool enhances performance of directional tools in extended reach", (Abstract) Society of Petroleum Engineers, (2011), pp. 450-461, vol. 1.
S. Yue, S. Yinao, L. Gensheng. L. Lin, T. Schouceng, "Transmission Characteristics of DPSK Mud Pressure Signals in a Straight Well", (Abstract) Petroleum Science and Technology, (2011), pp. 1249-1256, vol. 29.
Y. Zhidan, W. Chunming, G. Yanfeng, S. Jing, H. Xiufeng, L. Yuan, "Design of a rotary valve orifice for a continuous wave mud pulse generator", (Abstract) Precision Engineering, (Jul. 2015), pp. 111-118, vol. 41.
Z. Changqing, L. Kai, Z. Tong, M. Takei, R. Weian, "Investigation on the generation characteristic of pressure pulse wave signal during the measurement-while-drilling process", (abstract) AIP Conference Proceedings, (2014), pp. 341-346, vol. 1592.
Z. Wei Li, R. H. Wang, "Comparative Analysis on OQPSK and QDPSK of Continuous Pressure Wave System in Drilling Fluid Channel", (Abstract) Applied Mechanics and Materials, (2012), pp. 3607-3615, vol. 130-134, Trans Tech Publications Ltd., Switzerland.
A. Tripathi, G. Narayanan, "Analytical Evaluation and Reduction of Torque Harmonics in Induction Motor Drives Operated at Low Pulse Numbers", (Abstract) IEEE, (Feb. 2019), pp. 967-976, vol. 66, Issue 2, [online], [retrieved on Aug. 21, 2023], Retrieved from the Internet <https://ieeexplore.IEEE.org/document/8357491>.
Z. Wang, D. Gao, J. Fang, "Design of Reciprocating Valve Equipment Based on Rapidly Generating Drilling Fluid Continuous Wave Signal", (Abstract) 51st U.S. Rock Mechanics/Geomechanics Symposium, (Jun. 2017), [online], [retrieved on Aug. 21, 2023], Retrieved from the Internet <https://iq.ip.com/npl/onepetro/ARMA9228023>.
A. Greten, I. B. Brahim, W. Emmerich. O. Akimov, "Reliable Mud-Pulse Telemetry System for High-Resolution Real-Time Logs", (Abstract) SPE/IADC Drilling Conference and Exhibition, (Mar. 2017), [online], [retrieved on Aug. 21, 2023], Retrieved from the Internet <https://doi.org/10.2118/184666-MS>.
R. Hutin, R. W. Tennent, S.V. Kashikar, "New Mud Pulse Telemetry Techniques for Deepwater Applications and Improved Real-Time Data Capabilities", (Abstract) SPE/IADC Drilling Conference, (Feb. 27, 2001), [online], [retrieved on Aug. 21, 2023], Retrieved from the Internet <https://doi.org/10.2118/67762-MS>.
C. Klotz, P. Bond, I. Wasserman, S. Priegnitz, "A New Mud Pulse Telemetry System for Enhanced MWD/LWD Applications", (Abstract) SPE/IADC Drilling Conference, (Mar. 4, 2008), [online], [retrieved on Aug. 21, 2023], Retrieved from the Internet <https://onepetro.org/SPEDC/proceedings-abstract/08DC/All-08DC/SPE-112683-MS/143873>.
C. Klotz, I. Wassermann, D. Hahn, "Highly Flexible Mud-Pulse Telemetry: A New System", SPE Indian Oil and Gas Technical Conference and Exhibition, (Mar. 4, 2008), [online], [retrieved on Aug. 21, 2023], Retrieved from the Internet <https://doi.org/10.2118/113258-MS>.
F. Yuan, X. Gong, "Research on signal processing of continuous wave mud pulse", (Abstract) IEEE, (Aug. 2011), [online], [retrieved on Aug. 21, 2023], Retrieved from the Internet <https://ieeexplore.ieee.org/document/5987003/metrics#metrics>.

* cited by examiner

ELECTRIC MOTOR FOR OPERATING IN CONDUCTIVE FLUIDS AND RELATED METHOD

CROSS REFERENCE TO RELATED APPLICATIONS

This application claims the benefit of U.S. Provisional Application No. 62/941,009, entitled "Method of Transmitting Data Uphole and Related System", filed Nov. 27, 2019, which is incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to operating an electric motor in conductive fluids. More specifically, the disclosure relates to operating an electric motor with conductive fluid inside the motor in contact with the motor stator and motor rotor without shorting out.

Description of the Related Art

Electric motors use a stator and a rotor that rotates within an inner circumference of the stator or around an outer circumference of the stator. Electrical power to the motor creates a magnetic field that causes the rotor to rotate relative to the stator and generate rotational torque as output to a tool or other device using rotational energy. Typically, the stator contains electric wire wound around portions of the stator and connected to input circuitry and wires for control. The stator contains magnets around a circumference adjacent the rotor. A narrow gap between the stator and rotor avoids direct contact and avoids shorting out the motor. Stator magnets facing the rotor and rotor magnets facing the stator separated by the gap use the magnetic field to rotate the rotor to produce the rotational torque output.

The bane of electric motors is water, high moisture, and other conductive fluids that short out the motor and at times destroy the motor. Typically, operating within a moist area requires an enclosure for the motor that does not allow any substantial amount of conductive fluid into the motor.

The extreme operating conditions of high pressure and high temperature during the drilling and production of hydrocarbons test the capabilities of electric motors. A short circuit of a motor downhole while drilling can cost hundreds of thousands of dollars in lost time and equipment replacement to pull sometimes miles of downhole tubing out of a wellbore.

One example of electric motor use is in the drilling process for hydrocarbons in subterranean formations. In the drilling process for hydrocarbons, there are many different types of MWD and LWD (sometimes referred to as "MLWD") measuring instruments and tools that are used very close to the bit. These tools measure different parameters of the formation around them and calculate relevant information from the measurements. All of this raw data and calculated information is generally stored in each tool's data memory (which is referred to as "Logging While Drilling" or "LWD"). There may be several LWD tools in a Bottom Hole Assembly (BHA) close to the bit. In most cases, there is at least one Measurement While Drilling (MWD) tool in the BHA. All these MWD and LWD tools are capable of communication between them that can facilitate data transfer between them.

The MWD tool in many cases collects relevant data from many LWD tools and, along with its own data, transmits this data to the surface. This transmission of the data is also known as telemetry. There are many means of telemetry, including Mud Pulse, Electro Magnetic, Acoustic, Wired Drill Pipe, etc. The invention described below is a means to enable Mud Pulse telemetry and hence most of the discussion below covers this particular type of telemetry.

In Mud Pulse telemetry, the MWD tool contains a means to obstruct the mud flowing inside the pipe temporarily and then remove the obstruction, Series of these obstructions and removals are generated by the MWD tool, which in turn creates series of pressure pulses inside of the drill pipe. These series of pressure pulses are recognized at the surface by one or more pressure transducers, which are located in the standpipe on the rig floor.

There are two major types of Mud Pulse telemetry. One type involves the creation of a positive or a negative pressure pulse in the mud column. The change in pulse width or the distance between the pulses can carry the useful information from the MWD tool to the surface computer system via the pressure transducer in the standpipe. Another type involves the creation of an obstruction in a continuous fashion, where a substantial sine wave type of pressure wave is created in the mud column traveling uphole inside the pipe or uphole in the annulus around the pipe. By modulating this pressure wave using phase or frequency or amplitude modulation, the MWD tool can send relevant data to the surface computer via the standpipe pressure transducer. This is also known as continuous wave telemetry. The unmodulated continuous wave is also called the carrier.

The most common way to generate this carrier is by means of a continuously rotating valve. The valve consists of a valve stator and a valve rotor both having the same number of openings and substantially similar shape, and the valve rotor rotating in very close proximity of the valve stator. Due to this rotation, the obstruction to the mud flow is created as the openings are covered in the first part of the rotation, and then start opening up as the valve rotor rotates further. The design of these openings in the valve stator and valve rotor is such that a substantial sine wave pressure is created when rotated at a substantially constant speed. It is also known that instead of continuous rotation, the valve rotor can be oscillated like a clothes washing machine to create the continuous pressure wave.

In all cases known to the inventors today, the valve rotor is driven by an electric motor. The motor-rotor may be directly coupled to the motor shaft or coupled via a gearbox to the motor shaft to increase the torque. Due to the nature of the electric motor, it is imperative that the circulating mud in the pipe never be in contact with the electrical motor. Otherwise, the motor will short out electrically and burn up. Hence, these motors are generally immersed in a pool of non-conductive oil at higher pressure than the surrounding mud pressure and enclosed in a pressure housing. The oil generally lubricates and cools the rotating components of the motor and gearbox. There is elaborate scheme of rotating pressure seals that are deployed to connect the rotating shaft to the valve rotor. This mechanical assembly, consisting of the electrical motor and gearbox in the pressure housing immersed in the oil and rotationally attached to the valve rotor and modulator stator, is generally referred to as a modulator. Modulators in MWD and LWD tools are subjected to extreme downhole conditions of tens of thousands of pounds per square inch ("PSI") pressure, up to 200° C. temperature and shocks of hundreds of gravitational force equivalents ("G's").

Currently, only a few companies are known to the inventors that have some type of continuous wave generating modulator. As described above, due to the design of the electric motor, the modulator components have to be located in an oil pressure housing where mud cannot invade. This design is inherently expensive, fault prone and maintenance intensive. In many cases, due to the severe downhole conditions, the oil seal fails and the oil leaks out and mud invades the pressure housing, shorting out the motor and damaging other rotating components such as the gear box. In such cases, the expensive motor and all of the rotating components have to be discarded, resulting in increasing operational cost. There is also a huge cost due to having to pull the components out of the well, and associated nonproductive time because of the failure.

An example of a generator through which mud can flow is shown in U.S. Pat. No. 7,133,325. Mud flow through a tube passes through the generator over an impeller, which rotates a turbine rotor around a turbine stator to generate electricity. The generator keeps the mud from contacting electrical windings in the turbine stator by isolating the turbine stator from the mud via a deformable thin metal sheet. The metal sheet forms a wall to ensure fluid isolation. Further, the generator includes wide and stepped gaps between the "turbine stator" and the "turbine rotor", as referenced therein. As generators run at substantially higher rotational speeds, the larger gap benefits the lubrication between stators and rotors, but it also reduces the efficiency of the generator power output. A wide gap is generally unsuitable for a motor to develop sufficient power and torque for a given size and weight. Still further, the generator output is converted to direct current ("DC") output in most downhole applications. The generator is not controlled with rotational position control needed for indexing to specific rotational positions, is unable to create pressure waves for telemetry and other controlled angular rotation applications, and is unable to create precise oscillating rotation. The reduction of the magnetic coupling between the turbine stator and turbine rotor for the generator due to the large gap makes rotor position control virtually impossible. The precise control of the motor rotor position, also referred to as "motor controllability", is critical to many motor applications, especially to generate precise pressure wave frequency needed for the telemetry.

There remains a need for an improved electric motor design capable of having conductive fluid in contact with the motor stator, the motor rotor, or a combination thereof.

BRIEF DESCRIPTION OF THE SEVERAL VIEWS OF THE DRAWINGS

The present disclosure provides an electrical motor configured to operate with conductive fluids internal to the motor, including drilling fluids, without short-circuiting. In one embodiment, a modulator includes such electric motor and a valve coupled with the electric motor. The valve has a valve stator and a valve rotor, and the electric motor can be used to control accurately the valve opening and closing as the valve rotor rotates relative to the valve stator. The valve rotor can rotate continuously or in oscillations to generate a continuous pressure wave, such as for MWD/LWD communication. In one embodiment, the electric motor is designed such that the drilling mud can flow around and through the motor to bathe the motor in the mud without short-circuiting. In another embodiment, the drilling mud can flow into the motor until the mud pressure is balanced in the motor compared to the area immediately surrounding the motor, so that flow generally is reduced into the motor, but the motor is still bathed in the mud. A benefit is to eliminate the need for a high-pressure, oil-filled housing to house the electric motor. The electric motor can be used in other applications such as a Rotary Steerable Tool (RSS), a Formation Coring Tool, and other applications inside or outside the oil field environment.

The present disclosure provides an electric motor system, comprising: an electric motor rotor and an electric motor stator disposed circumferentially with the electric motor rotor; and at least one of the motor stator and motor rotor comprising an electric motor winding and a termination for the winding, the winding and termination having a nonconductive coating; wherein the electric motor is configured to allow a conductive liquid to contact the electric motor rotor and the electric motor stator without short-circuiting the electric motor.

The present disclosure provides a method of operating an electric motor system having an electric motor rotor and an electric motor stator disposed circumferentially with electric motor rotor, and at least one of the motor stator and motor rotor comprising an electric motor winding and a termination for the winding, the winding and termination having a nonconductive coating, the method comprising: flowing a conductive liquid into contact with the electric motor stator and the electric motor rotor while operating the electric motor without short circuiting the electric motor.

BRIEF DESCRIPTION OF THE SEVERAL VIEWS OF THE DRAWINGS

Figure 1:
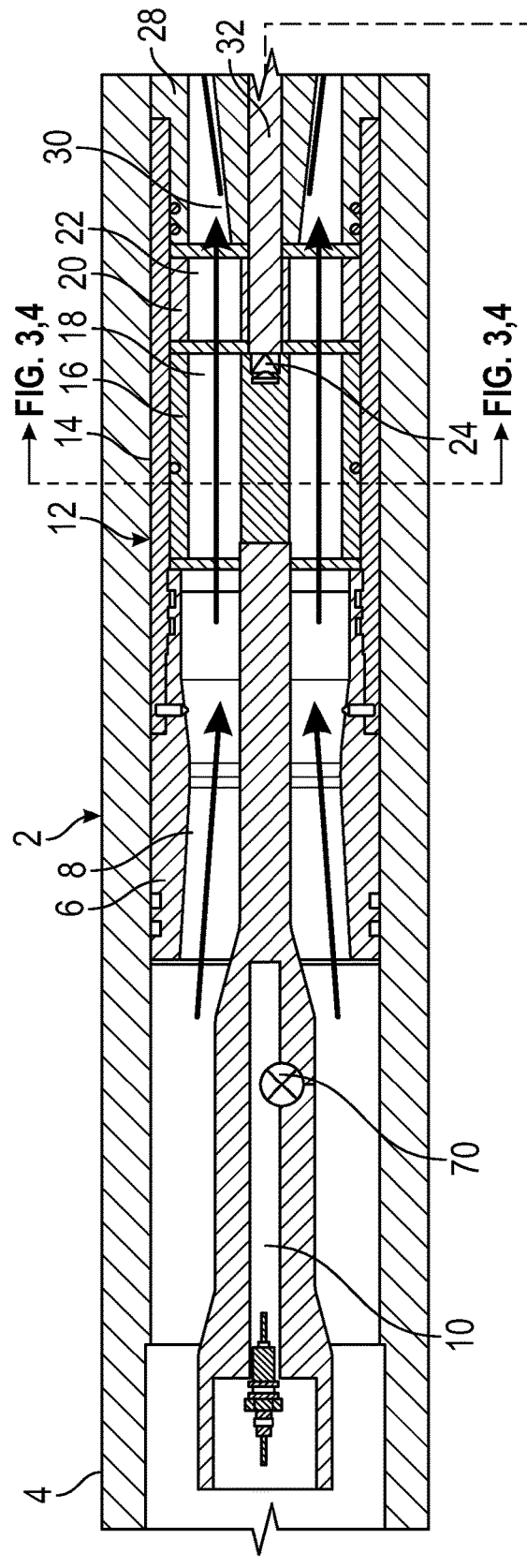
Figure 1:
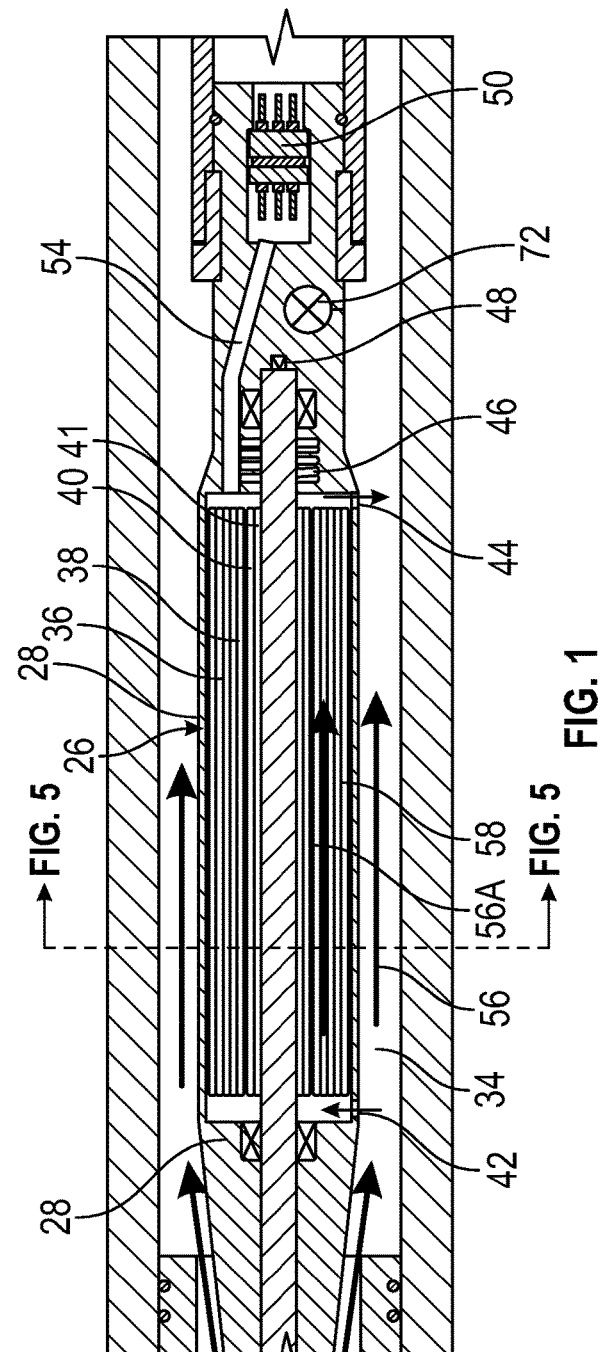

FIG. 1 is a schematic longitudinal cross sectional view of an exemplary embodiment of a system having a modulator with an electric motor according to the present invention coupled with a continuous wave modulator valve.

Figure 2:
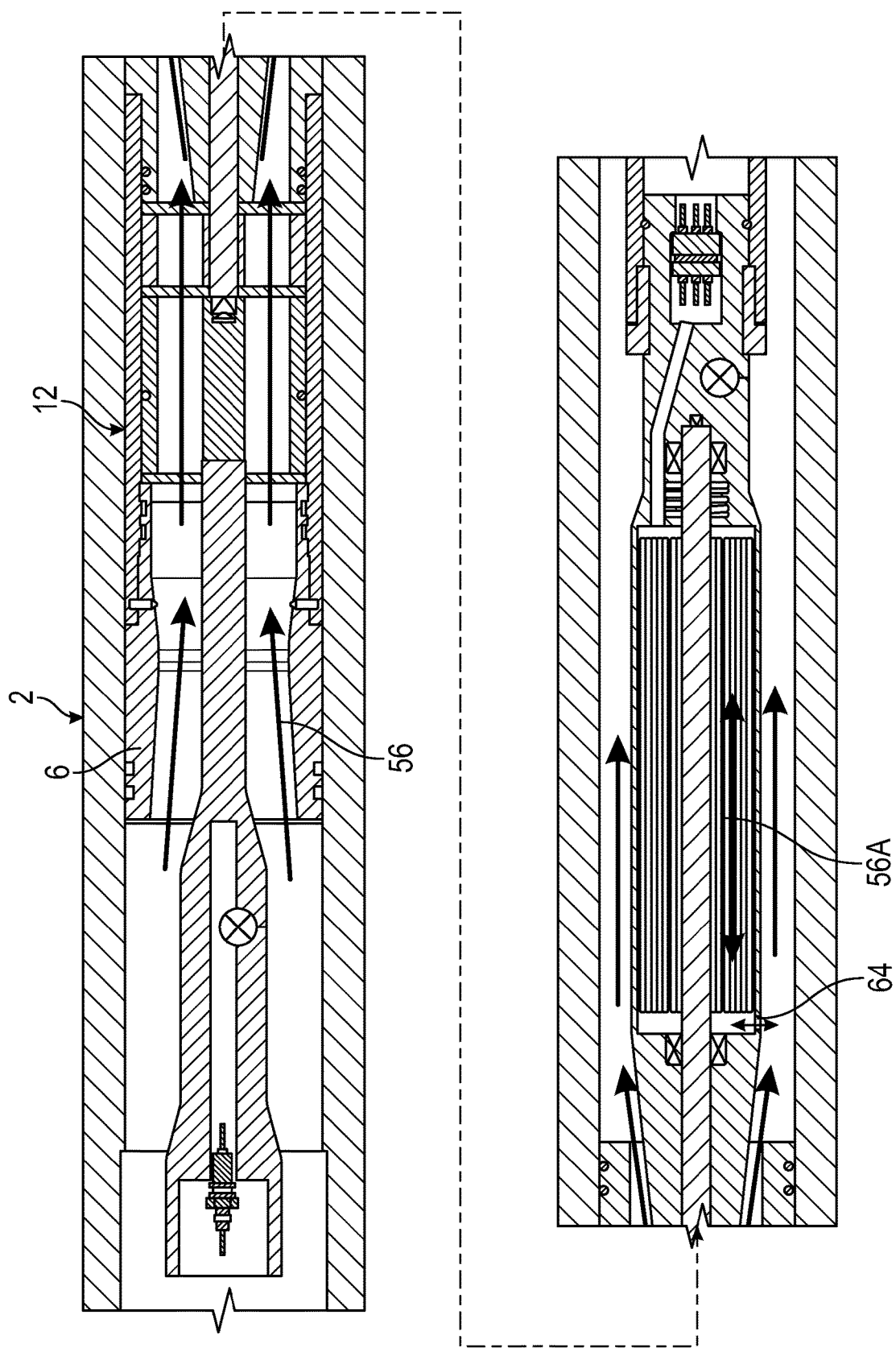

FIG. 2 is a schematic longitudinal cross sectional view of another embodiment example of a system having a modulator with an electric motor according to the present invention coupled with a continuous wave modulator valve.

Figure 3:
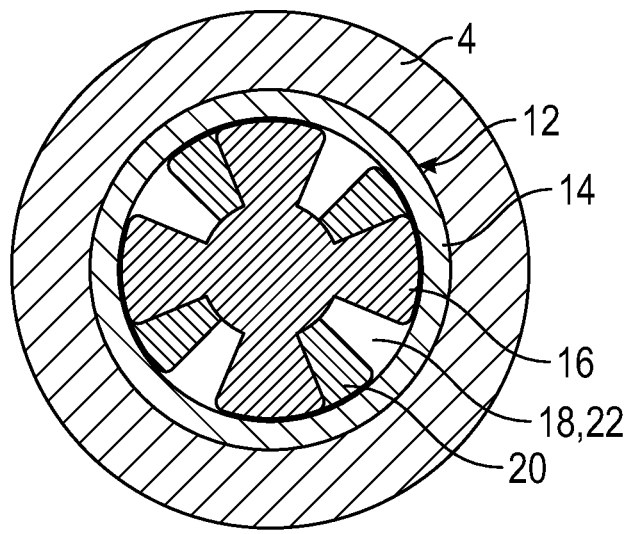

FIG. 3 is a schematic transverse cross sectional view through the valve showing a valve rotor partially aligned with a valve stator for a partially open flow channel through the valve.

Figure 4:
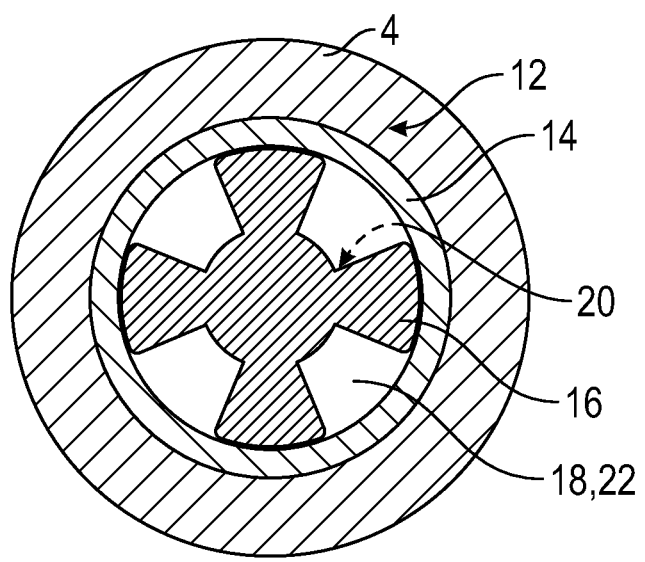

FIG. 4 is a schematic transverse cross sectional view through the valve showing the valve rotor fully aligned with the valve stator for a fully open flow channel through the valve.

Figure 5:
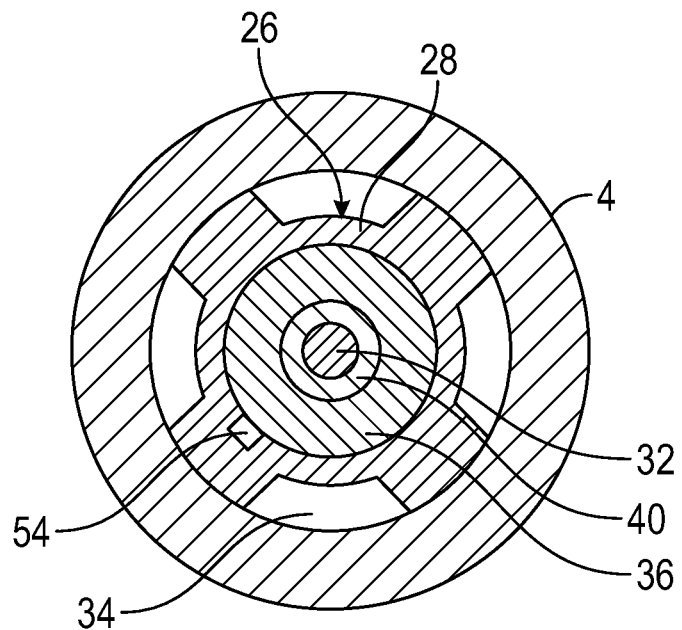

FIG. 5 is a schematic transverse cross sectional view through the motor showing flow channels for mud to flow around the electric motor.

Figure 6:
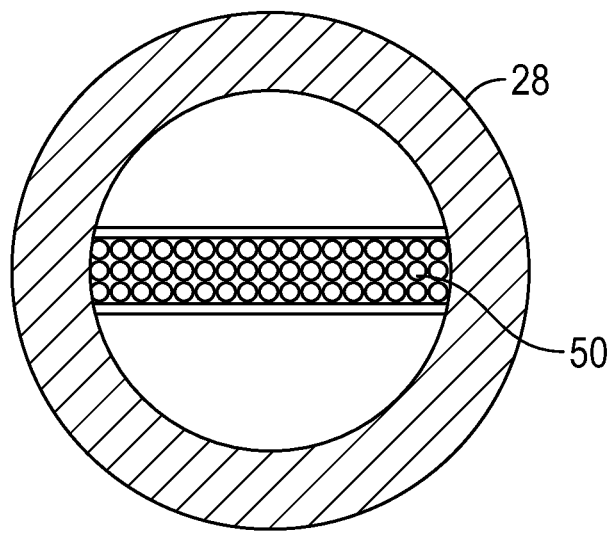

FIG. 6 is a schematic transverse cross sectional view through the electric motor showing an electric termination block for the electric motor.

Figure 7:
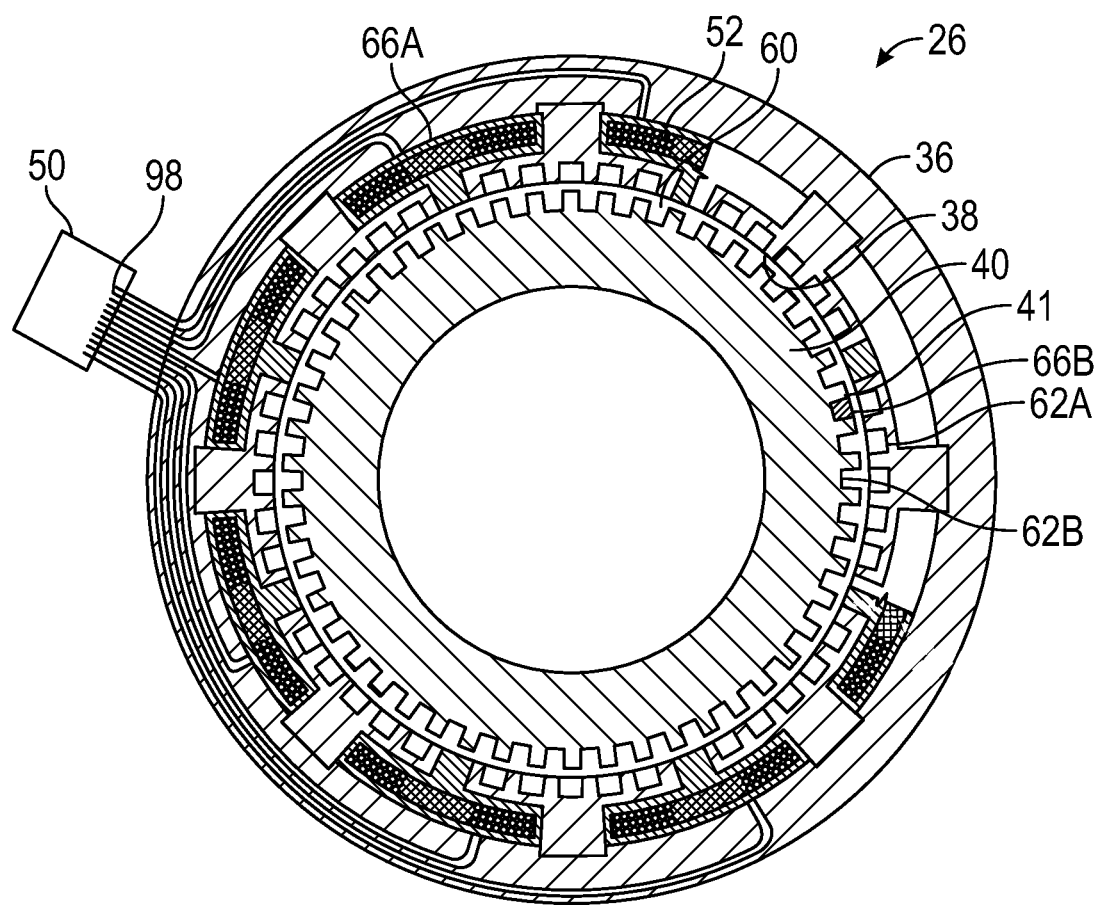

FIG. 7 is a schematic transverse cross sectional view through the electric motor showing aspects of a mud flow path through the electric motor between the motor stator and motor rotor.

Figure 8:
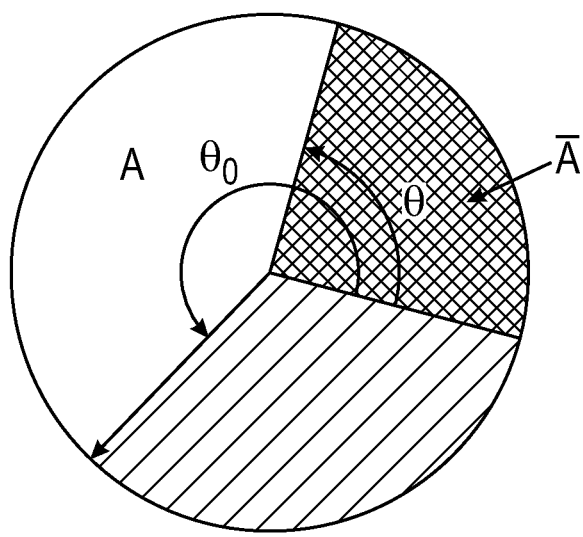

FIG. 8 is a diagram of an analytic mud modulator fluid dynamic model.

Figure 9:
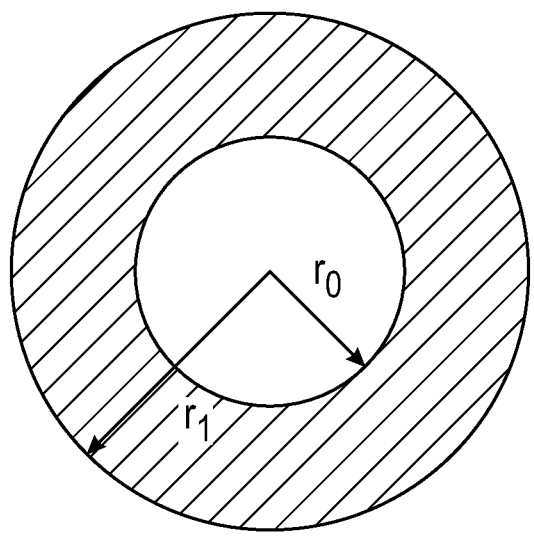

FIG. 9 is a diagram of an analytic model to calculate an effective radius for an applied thrust load on a thrust bearing for the modulator.

Figure 10:
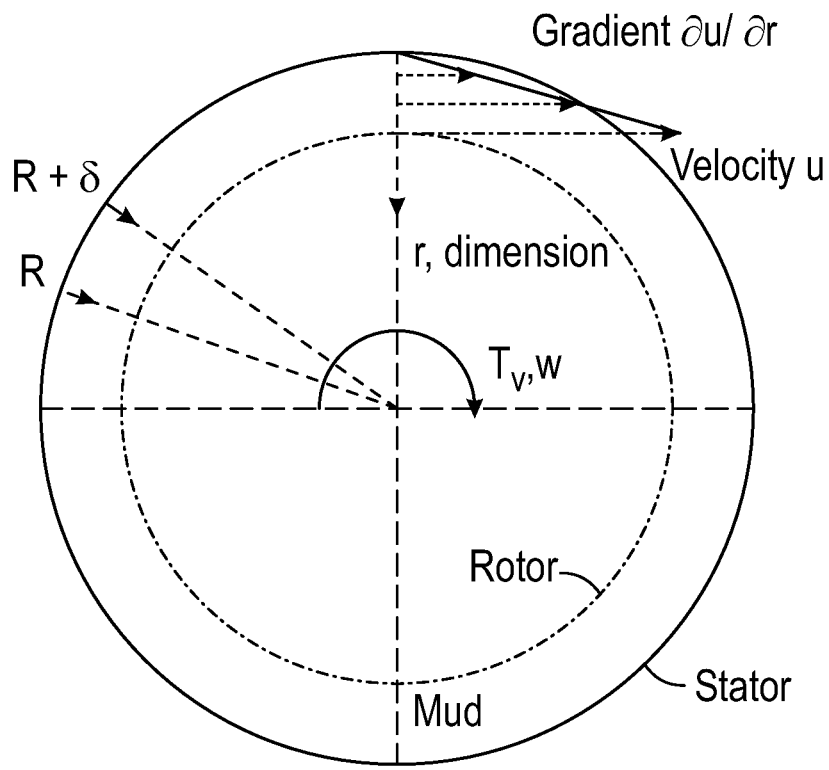

FIG. 10 is a diagram to illustrate laminar shear of fluid between the rotor and stator of the electric motor.

Figure 11:
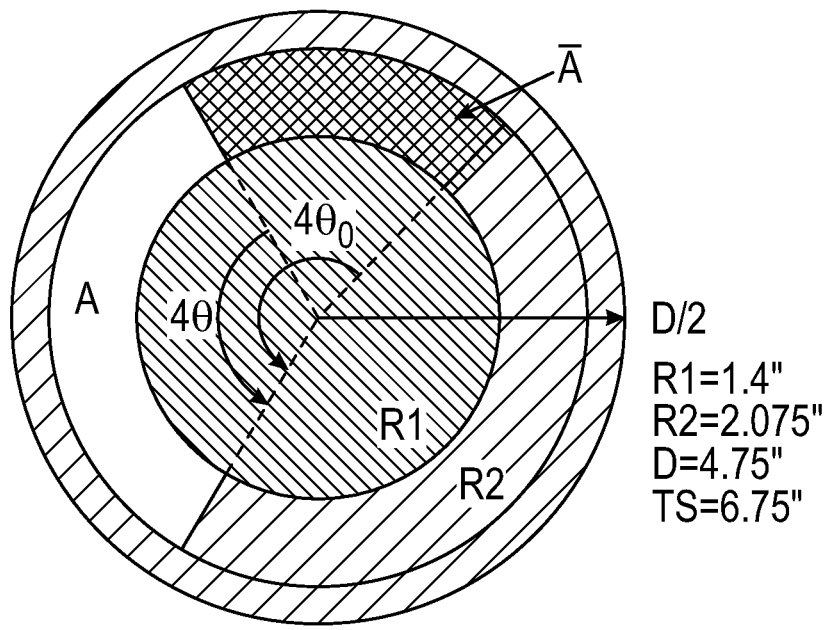

FIG. 11 is a diagram to illustrate an analytic simulation model for torque requirements upon the electric motor to operate the valve as an oscillator.

Figure 12A:
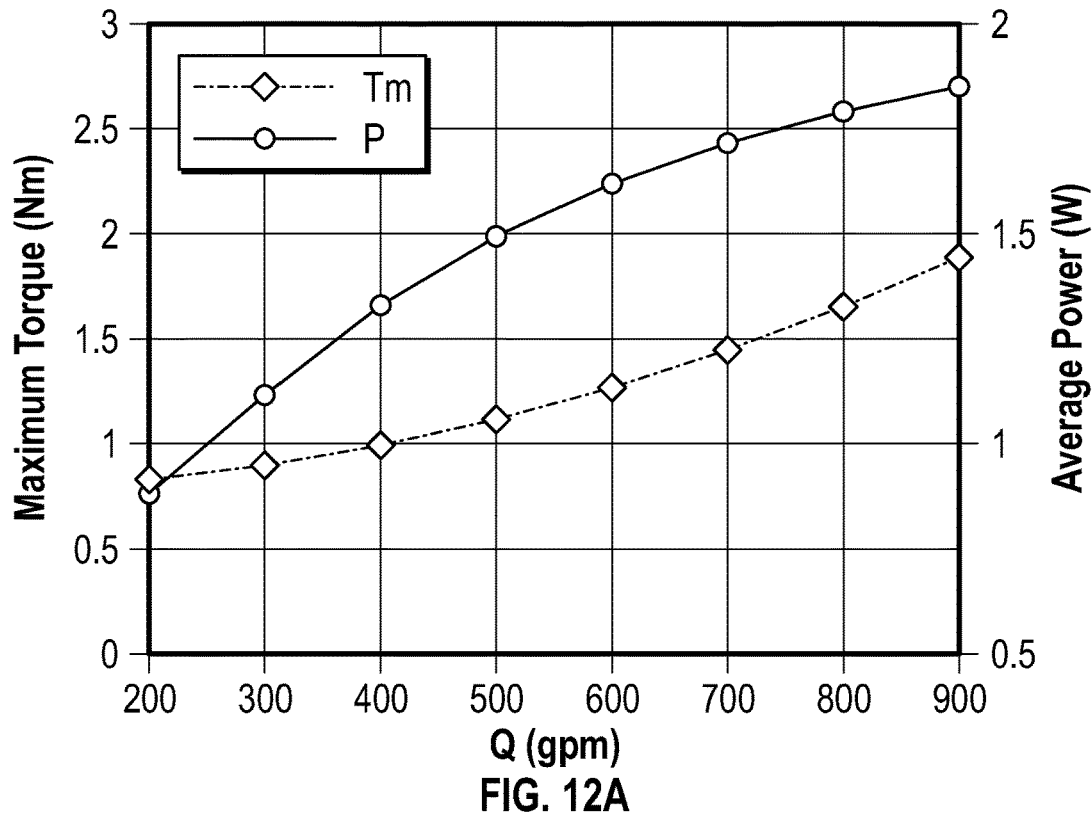

FIG. 12A is a chart to illustrate exemplary maximum torque and average power requirement vs. flow rate at a first mud density.

Figure 12B:
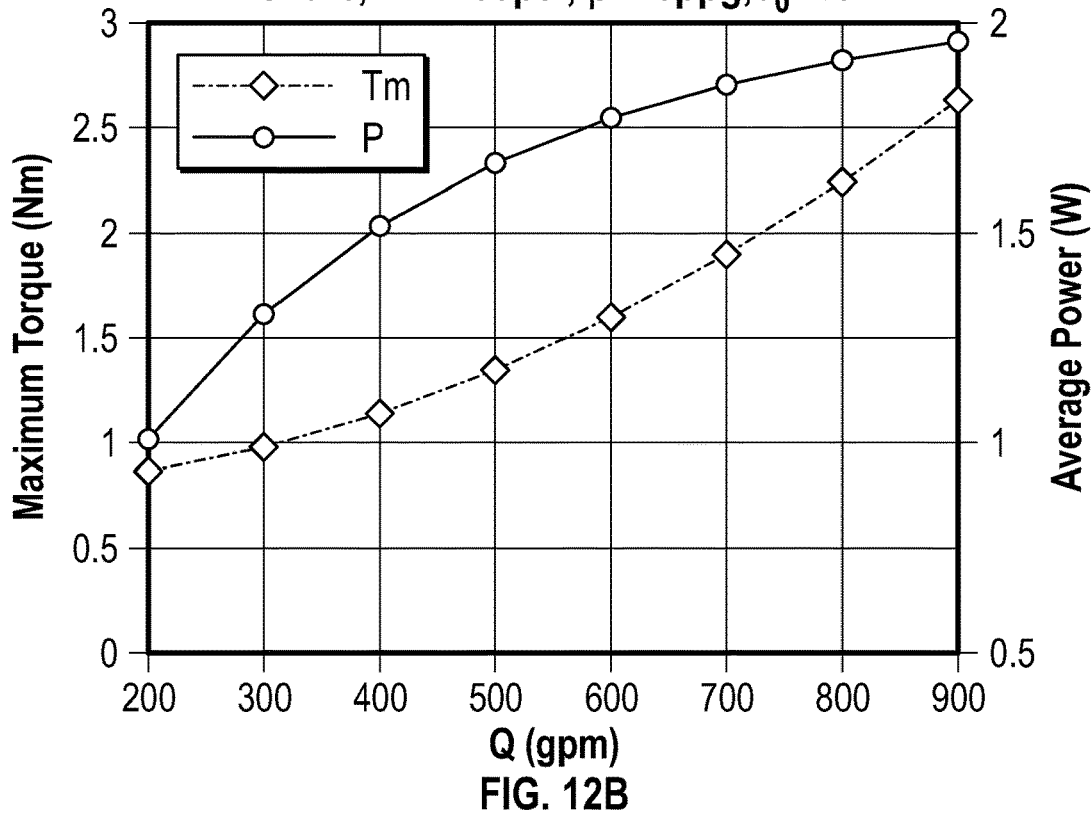

FIG. 12B is a chart to illustrate exemplary maximum torque and average power requirement vs. flow rate at a second greater mud density.

Figure 13A:
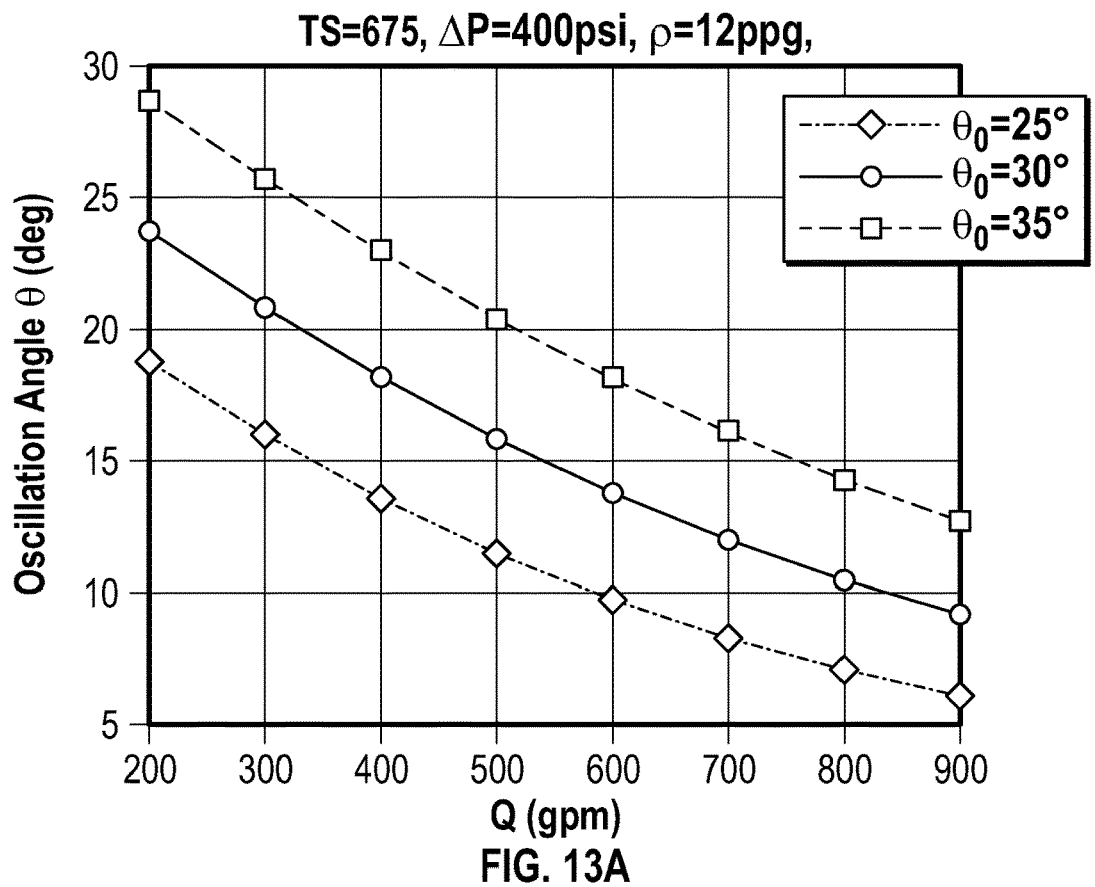

FIG. 13A is a chart to illustrate exemplary oscillation angle vs. flow rate at a first mud density.

Figure 13B:
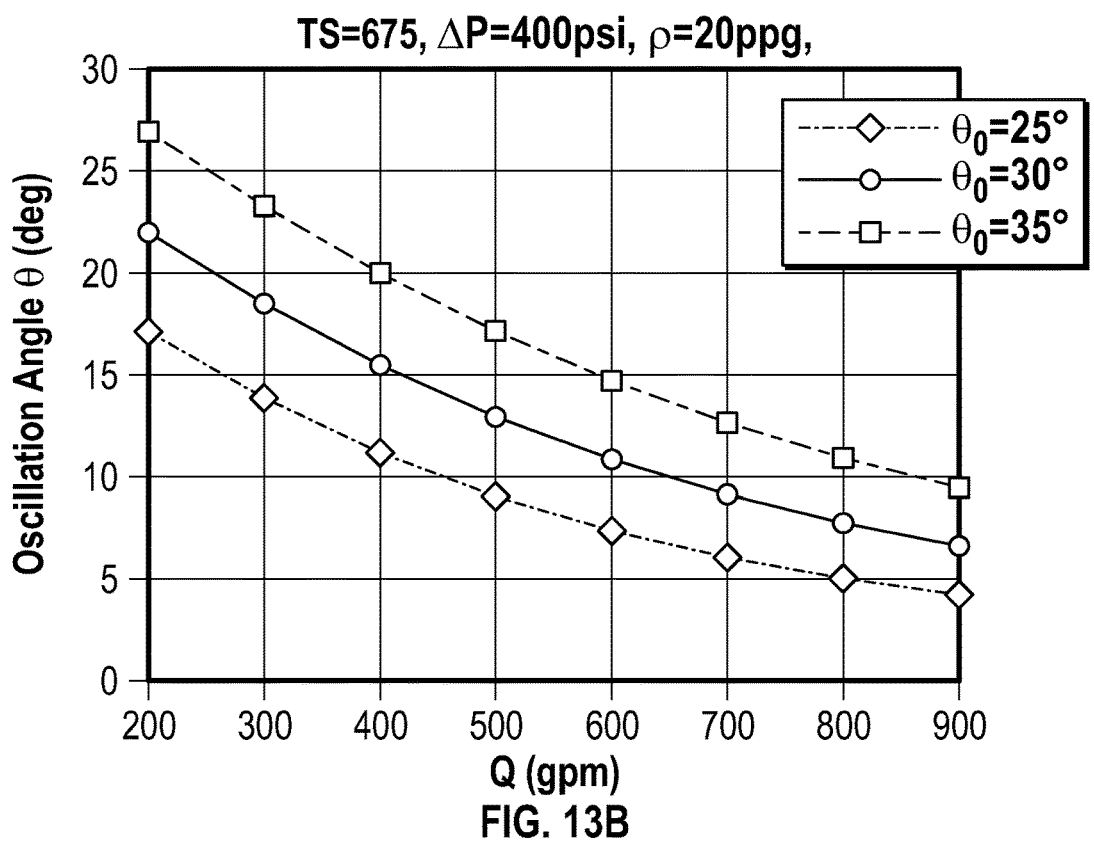

FIG. 13B is a chart to illustrate exemplary oscillation angle vs. flow rate at a second greater mud density.

Figure 14A:
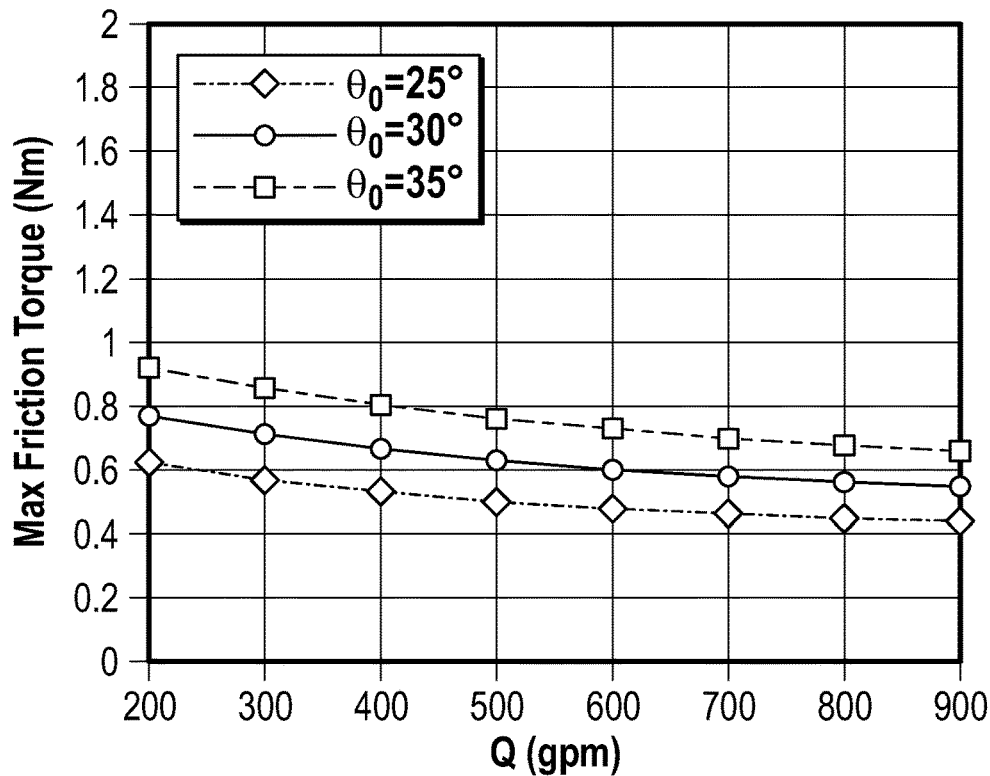

FIG. 14A is a chart to illustrate exemplary maximum friction torque vs. flow rate at a given mud density.

Figure 14B:
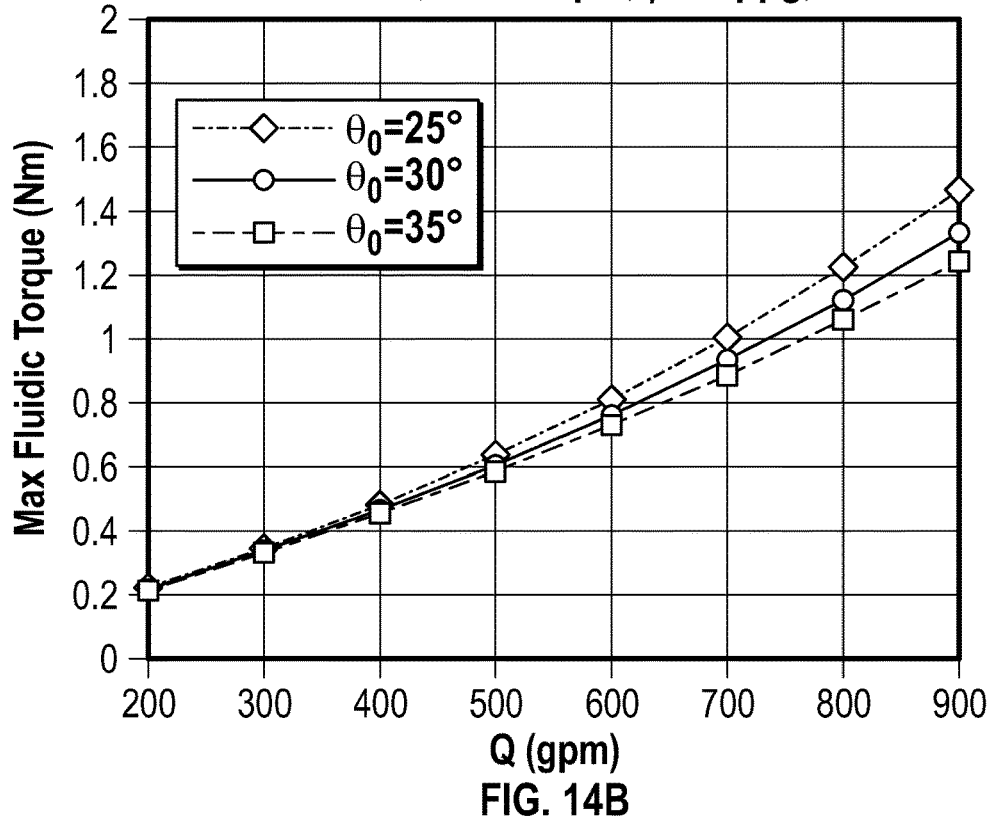

FIG. 14B is a chart to illustrate exemplary maximum fluidic torque vs. flow rate for such given mud density.

Figure 15A:
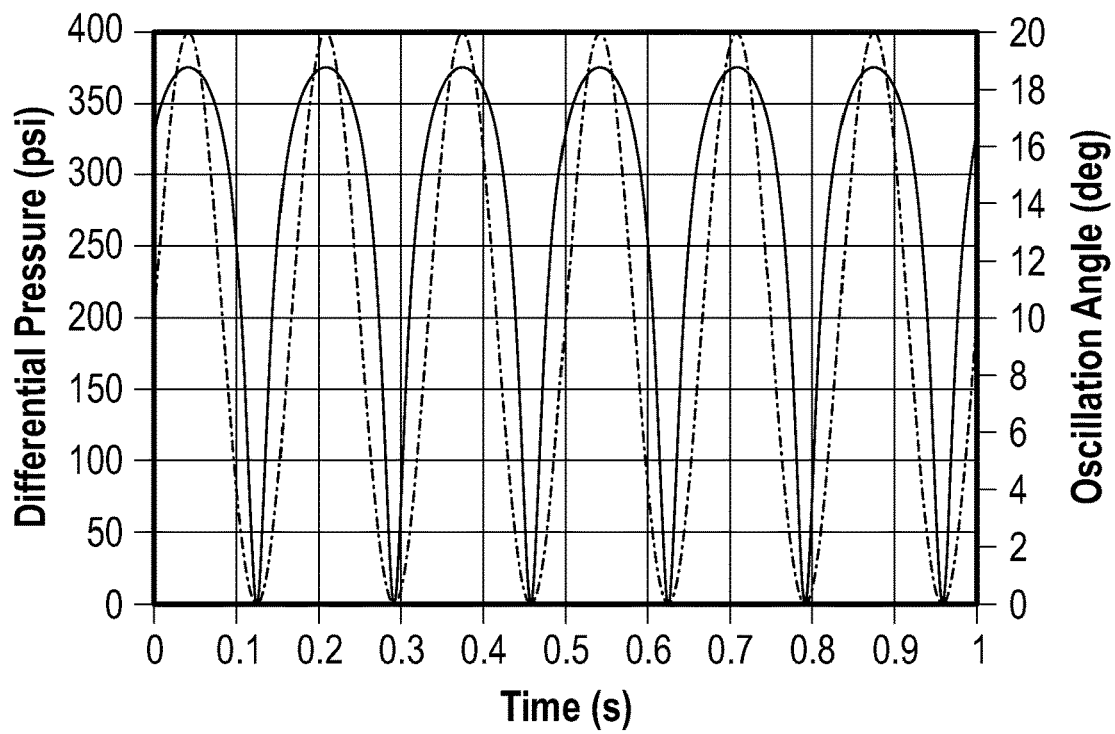

FIG. 15A is a chart to illustrate exemplary oscillation angle vs. differential pressure at a first flow rate.

Figure 15B:
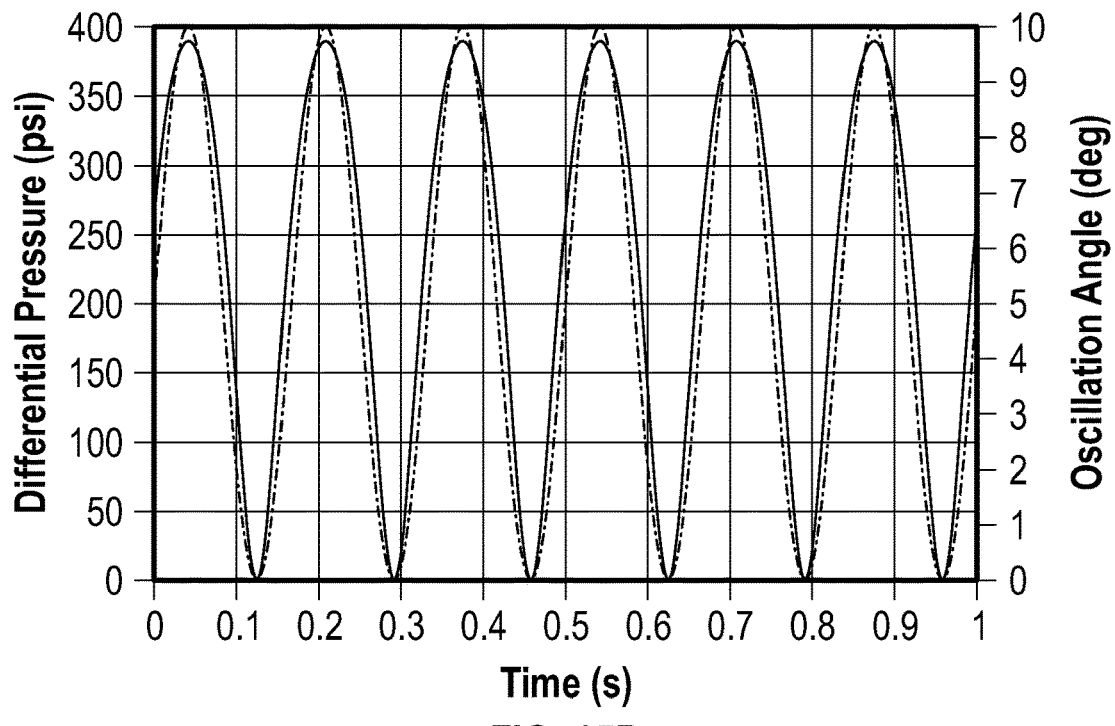

FIG. 15B is a chart to illustrate exemplary oscillation angle vs. differential pressure at a second greater flow rate.

Figure 16A:
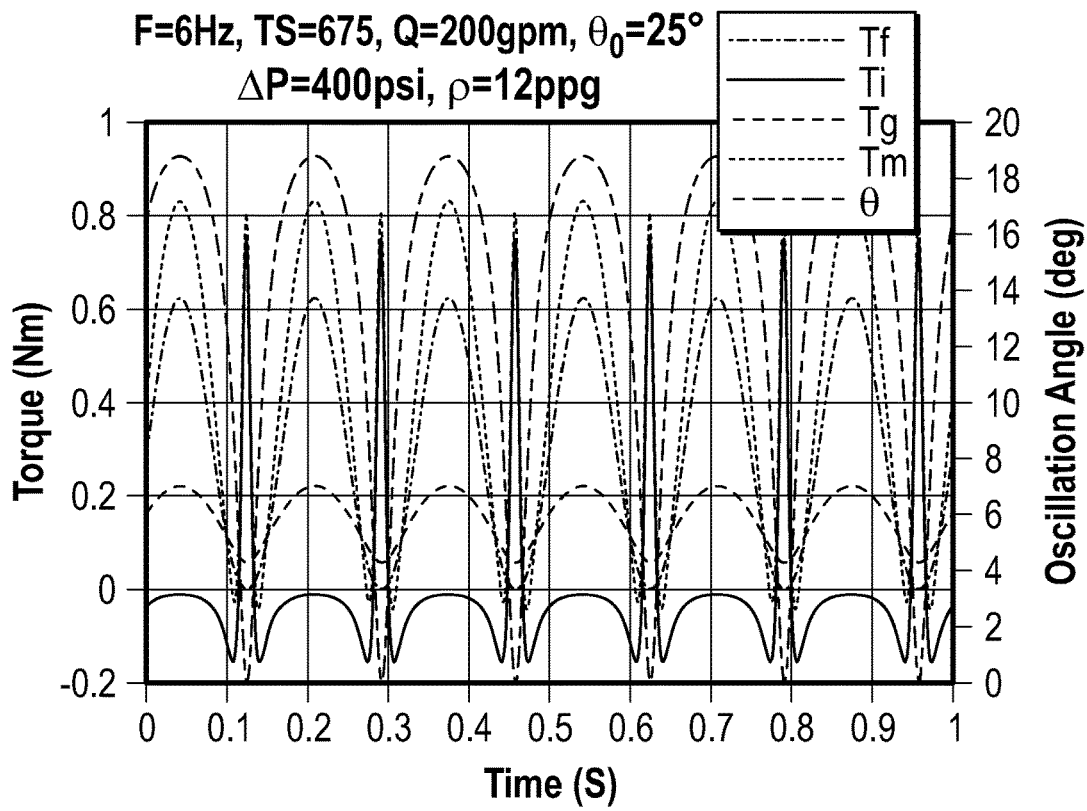

FIG. 16A is a chart to illustrate exemplary torque contribution vs. time at a first flow rate.

Figure 16B:
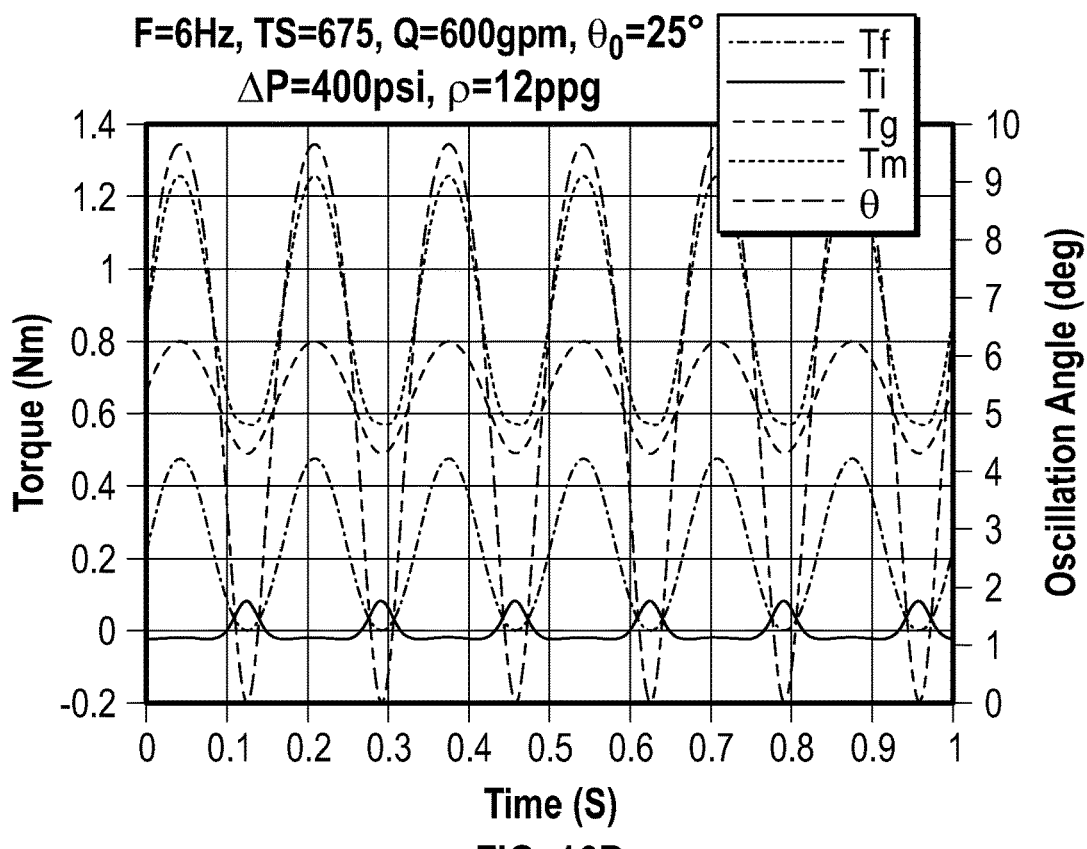

FIG. 16B is a chart to illustrate exemplary torque contribution vs. time at a second greater flow rate.

Figure 17A:
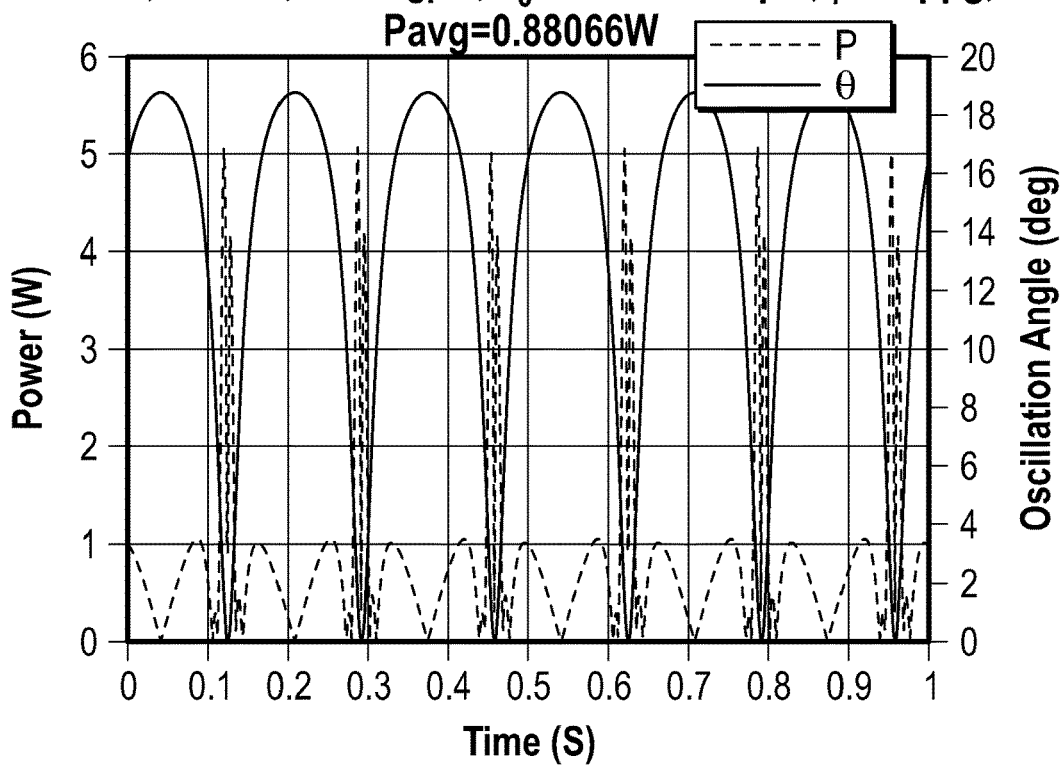

FIG. 17A is a chart to illustrate exemplary power vs. time at a first flow rate.

Figure 17B:
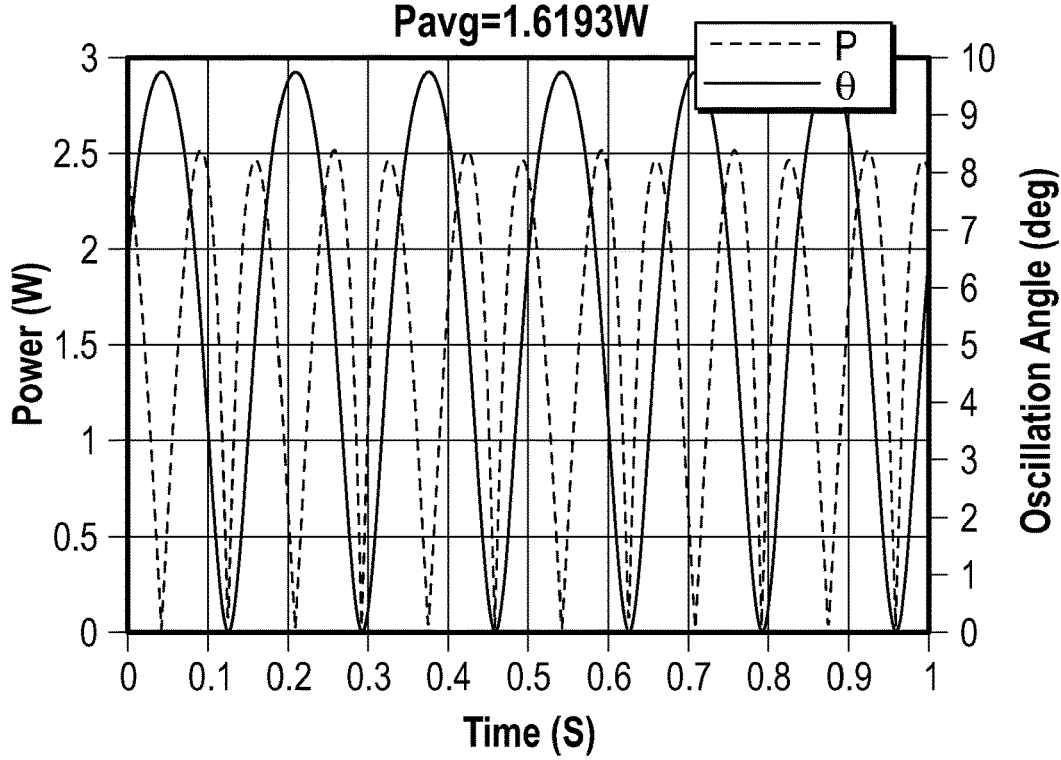

FIG. 17B is a chart to illustrate exemplary power vs. time at a second greater flow rate.

Figure 18:
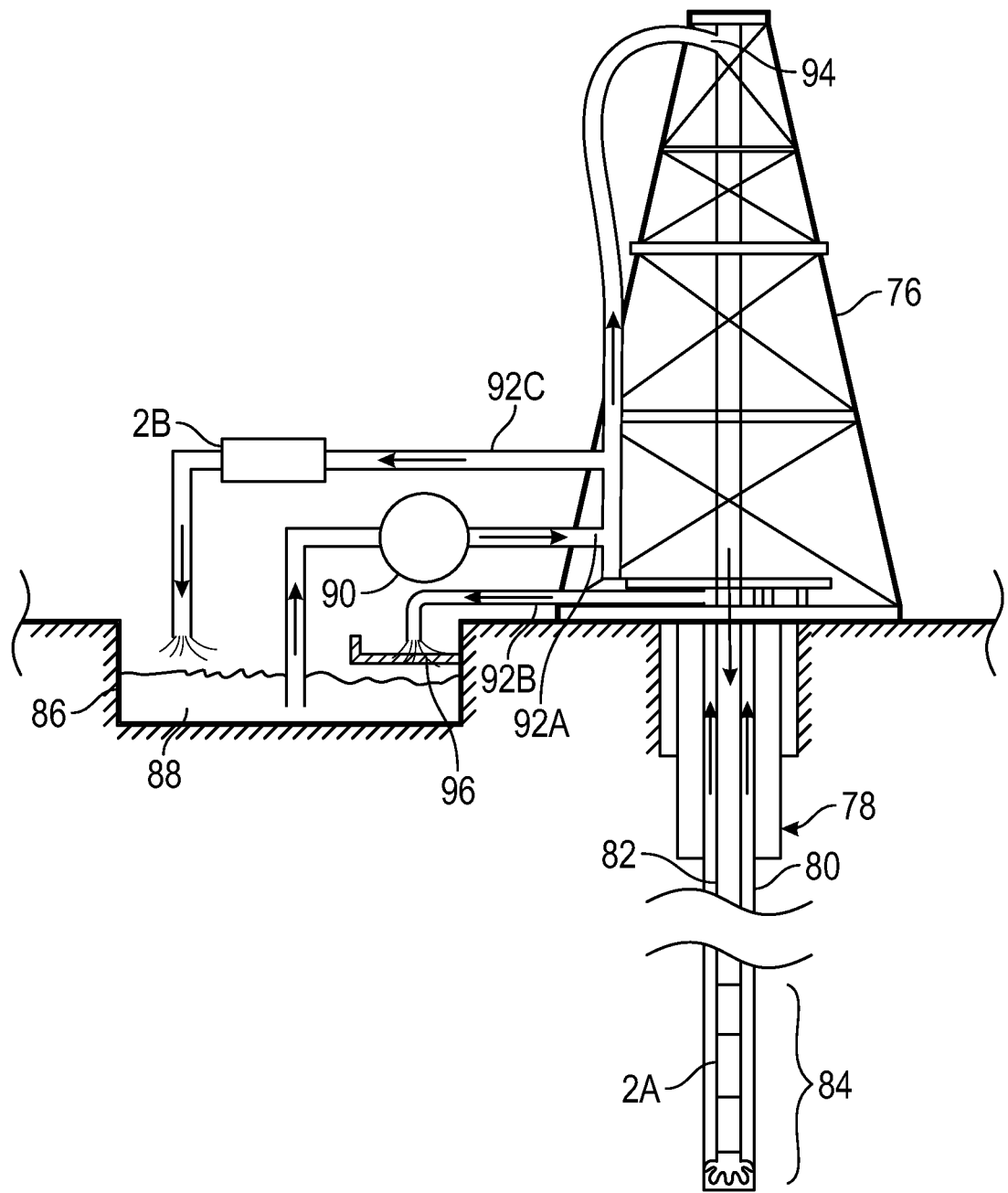

FIG. 18 is a schematic of another embodiment having a modulator located uphole for a downlink in a wellbore.

Figure 19:
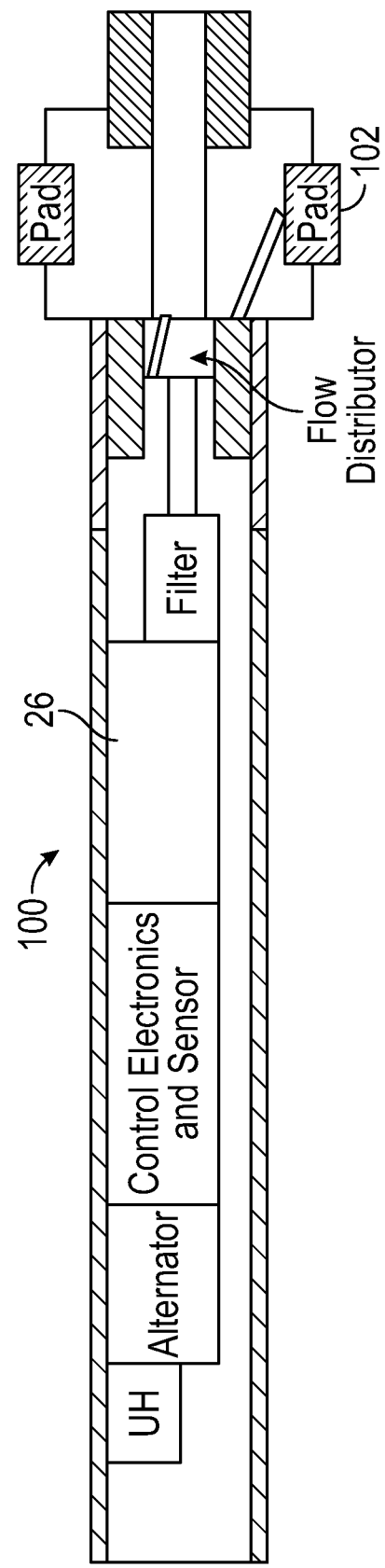

FIG. 19 is a schematic of another embodiment having the electric motor as a component in a rotary steering tool.

Figure 20:
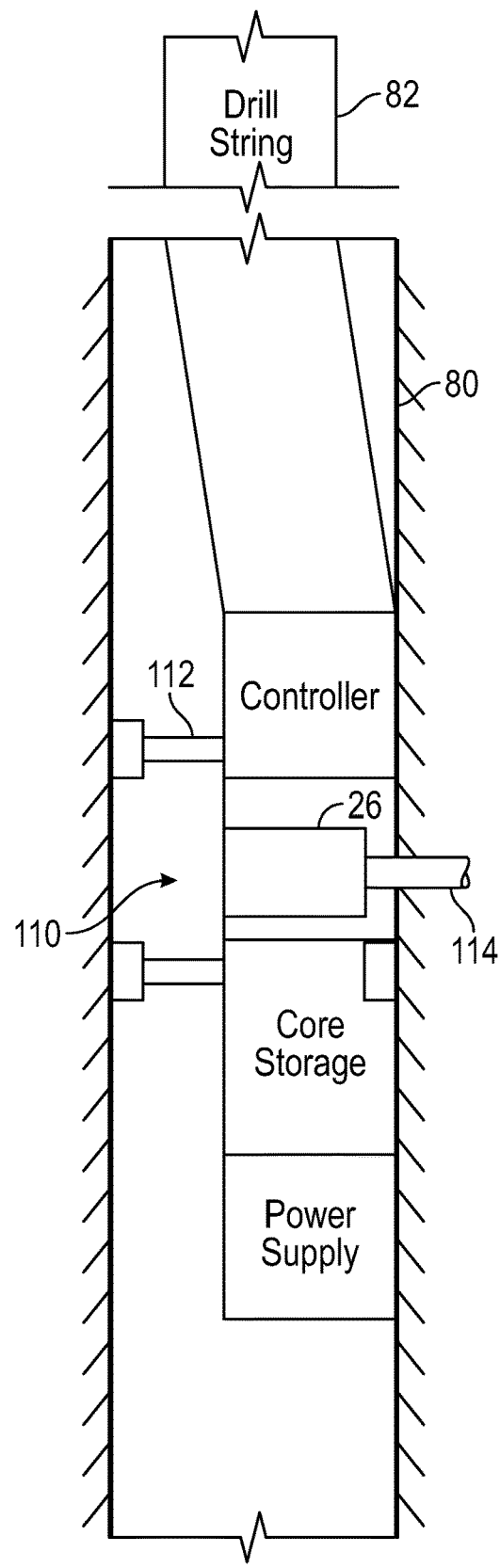

FIG. 20 is a schematic of another embodiment having the electric motor as a component in a formation coring tool.

DETAILED DESCRIPTION

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation or location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally. The device or system may be used in a number of directions and orientations. The order of steps can occur in a variety of sequences unless otherwise specifically limited. The use of the term "exemplary" indicates an example among other possible configurations and methods. The various steps described herein can be combined with other steps, interlineated with the stated steps, and/or split into multiple steps. Some elements are nominated by a device name for simplicity and would be understood to include a system or a section, such as a processor, would encompass a processing system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. The term "rotation" can include, as applicable, a generally one-direction rotation that may start and stop or vary in speed to form the pressure wave but generally in the same direction (herein "continuous rotation"), or alternatively a back and forth rotation that may also start and stop or vary in speed in addition to reversing rotational direction to form the pressure wave (herein "oscillating rotation").

The present disclosure provides an electrical motor configured to operate with conductive fluids internal to the motor, including drilling fluids (also termed "mud"), without short-circuiting. The concept of a mud lubricated modulator with an electric motor advantageously allows an electric motor to be a stepper motor or a hybrid servo motor that is capable of delivering large torque at low RPM, and therefore eliminates the need of a gearbox. Further, the conductive fluid-immersed motor eliminates the need of a face seal and a rotating seal, oil-mud interface, and oil compensation system that is currently used by competing systems. One benefit of using a stepper motor is that it can be controlled relatively accurately in open loop. For example, a typical 2-phase hybrid stepper motor with 50 teeth has a step size of 1.8° with full steeping and 0.9° with half stepping. The step size may be reduced further by using micro-stepping. However, a shaft position sensing may be still needed for micro-stepping, and generally to improve shaft angular position accuracy. Because a stepper motor or a hybrid servo motor can produce large torque at low RPM, it could drive the shaft and valve rotor directly without a gearbox. Without a gearbox, the motor may be sealingly coated with a nonconductive coating and packaged in a mud flow path through the modulator and valving therein as shown in FIG. 1.

In one embodiment, a modulator includes such electric motor and a valve coupled with the electric motor. The valve has a valve stator and a valve rotor, and the electric motor can be used to control accurately the valve opening and closing as the valve rotor rotates relative to the valve stator. The valve rotor can rotate continuously or in oscillations to generate a continuous pressure wave, such as for MWD/LWD communication. In one embodiment, the electric motor is designed such that the drilling mud can flow around and through the motor to bathe the motor in the mud without short-circuiting. In another embodiment, the drilling mud can flow into the motor until the mud pressure is balanced in the motor compared to the volume immediately surrounding the motor, so that flow generally is reduced into the motor, but the motor is still bathed in the mud. A benefit is to eliminate the need for a high-pressure, oil-filled housing to house the electric motor. The electric motor can be used in other applications such as a Rotary Steerable Tool (RSS), a Formation Coring Tool, and other applications inside and outside the oil field environment.

In at least some embodiments, a conductive fluid-immersed electrical motor may be a conductive fluid-immersed stepper motor or a conductive fluid-immersed hybrid servomotor having a motor rotor and a motor stator. The benefit of a conductive fluid-immersed stepper motor or a conductive fluid-immersed hybrid servo motor is that it can generate large torque at low RPM, and thus reduce or eliminate the need of a gearbox, that is, the electric motor can operate independent of a gearbox. A gap between the motor stator and motor rotor is used to allow the mud flow into the motor to cool and lubricate the bearings. The motor may have the motor stator, motor rotor, or both, sealingly coated with a wear resistant non-conductive material (such as epoxies, phenolics, and other nonconductive abrasion resistant material) to create a smooth wear-resistant opposing surface or surfaces between the motor rotor and the motor stator. Coating with the non-conductive material could also reduce or eliminate voids that would either fail or stress surrounding components under pressure. For example, the motor stator can be filled with the non-conductive material to create a smooth inside diameter. In such embodiment, the motor rotor slots might not be filled with a coating to let the mud flow to lubricate the bearings on the both sides of the motor. This embodiment also allows minimizing a gap between the stator tooth and rotor tooth and thus maximizing the efficiency and torque output. The rotating, such as by oscillating, motion of the motor rotor tooth may also help to sweep out particles in the mud and accelerate the mud flow passing through the gap between the motor stator and motor rotor, resulting in better lubrication of the bearings. In the alternative, the stator teeth might not be filled and the rotor teeth filled. In a further alternative, both the motor rotor and the motor stator teeth could be filled.

When generating a continuous pressure wave for MWD communication in oscillating mode, the size and sometimes shape of the wave is used to generate the code to communicating accurately the intended message. Accurate control of the modulator is important to the accuracy of the transmitted message. At least two pressure sensors can be inserted at appropriate places along the flow path of the modulator to measure the differential pressure across the modulator. Using this differential pressure, controls can adaptively adjust the oscillating angle to achieve the prescribed differential pressure amplitude, and compensate for variations in flow rate and mud weight. The adjustments can also reduce erosion during high flow rates and generate enough signal strength during low flow rates. The shape of the open area of the valve stator and rotor can be designed to generate substantial sinusoidal waves for the pressure pulse while rotating the valve rotor at substantially constant speed. Alternatively, the shape of the open area of the valve stator and rotor can be designed to generate substantial sinusoidal waves for the pressure pulse while oscillating the valve rotor bidirectionally, such as clockwise and counter clockwise. In some embodiments, the angular speed of the rotation can be adjusted frequently to achieve the desired shape of the pressure wave including a substantial sine wave.

By modulating the continuous pressure wave carrier that is generated by a modulator using methodology such as phase-shift keying (PSK), frequency-shift keying (FSK), amplitude-shift keying (ASK) and others, the MWD/LWD/RSS data communication can be achieved from downhole tools to the surface computer. A modulator can be used at the surface with the same or similar modulation techniques to communicate from the surface to the downhole MWD/LWD/RSS tools.

The conductive fluid-immersed electrical motor could be used in other downhole applications such as a Rotary Steerable Tool (RSS), Electric Power Generation (Turbine-Generator), or Formation Coring Tool.

FIG. 1 is a schematic longitudinal cross sectional view of an exemplary embodiment of a system having a modulator with an electric motor according to the present invention coupled with a continuous wave modulator valve. A modulator 2 can be installed within a modulator housing 4. The modulator can include an inlet 6 having one or more mud inlet openings 8 to allow mud flowing through the modulator housing 4 into the modulator assembly. An electrical passage 10 can allow wiring such as for power and electrical control to pass in and through the modulator. The inlet 6 can be sealingly coated with one or more seals to the modulator housing to help direct the mud through the assembly.

A valve 12 having a valve housing 14 can be coupled with the inlet 6. A valve stator 16 can be disposed therein and sealingly coated to the valve housing. The valve stator 16 includes one or more valve stator flow openings 18 that are fluidicly coupled to the mud inlet openings 8. Generally, the stator remains in a fixed position within the housing 14. A valve rotor 20 can be coupled adjacent the valve stator 16 and rotationally decoupled therefrom to allow rotation of the valve rotor relative to the valve stator. The center of the motor rotor can be hollowed to reduce the rotational inertia of the motor rotor. The valve rotor 20 includes one or more valve rotor flow openings 22 that can be aligned with the valve stator flow openings 18 periodically during rotation of the valve rotor relative to the valve stator. Further, the assembly can include thrust bearings at various positions to mitigate thrust on the assembly from the mud flowing through the assembly and rotational friction of one or more components, such as the valve rotor relative to the adjacent stationary components. For example, a thrust bearing 24 can be located in the stator to support the rotor, described below.

A motor 26 can be coupled adjacent the valve rotor 20 and rotationally decoupled therefrom. The motor 26 includes a motor housing 28. One or more motor inlet openings 30 are formed in the motor housing that are fluidicly coupled to the valve rotor flow openings 22 in the valve rotor 20. The motor inlet openings 30 allow mud to flow on an external portion of the motor housing in one or more peripheral openings 34 between the housing and the modulator housing 4. Further, one or more motor housing inlets 42 and motor housing outlets 44 can allow ingress and egress of mud into a motor portion containing an electrical motor stator 36 and electric motor rotor 40. In this embodiment, the motor stator is shown external to the motor rotor, so that the motor rotor rotates within an inner circumference of the motor stator. The teachings herein are applicable to alternative forms of electric motors including a motor rotor that rotates around an outer circumference of a motor stator. The modulator can provide filtration at various locations for larger particles prior to entering the motor housing 28. The motor stator 36 is generally formed with longitudinal teeth around an inner diameter of the motor stator, as is known to those with ordinary skill in the art. Such teeth can form longitudinal grooves 58 therebetween along the inner circumference of the motor stator and the other circumference of the motor rotor. In at least one embodiment, the longitudinal grooves 58 can form passageways to allow mud passing through the motor to flow therethrough and assist in lubrication and cooling of the motor.

The motor rotor 40 is rotationally decoupled from the motor stator 36 and rotates within the motor stator according to a field generated by the motor stator. The motor rotor 40 is coupled with a driveshaft 32 passing through a central axis of the motor rotor, so that the driveshaft rotates with the motor rotor. In turn, the driveshaft 32 is coupled with the valve rotor 20 to provide a driving rotational force from the motor 26 to the valve rotor 20. Some amount of clearance to form a gap 60 is provided between the inner diameter of the motor stator and the outer diameter of the motor rotor. Therefore, mud flowing into the motor can also flow between the motor stator and the motor rotor interface. A bias element 46, such as a coiled spring, can be disposed at a position along the drive shaft 32. The bias element can absorb shock loading caused by the interruptions in mud flow as the valve rotor flow openings 22 rotate in and out of alignment with the valve stator flow openings 18. A drive shaft thrust bearing 48 can assist in reducing friction on the driveshaft as it rotates the valve rotor 20. The motor 26 can further include a portion containing a wire connection module 50. Electrical wiring such as from a location inside the tool or BHA that passes through the electrical passage 10 and through other portions of the assembly including an electrical passage 54 can be coupled to the wire connection module 50 for operation of the motor.

Thus, the mud in the well can flow in a flow path 56 through the modulator from an upstream location through the inlet housing 6 with mud inlet openings 8, the valve stator 16 with valve stator flow openings 18, the valve rotor 20 with valve rotor flow openings 22, the motor housing 28 with motor inlet openings 30, around the external periphery of the motor housing and within the motor housing through the valve stator and valve rotor mud flow path 56A, and out of the motor housing into the tool housing 4 bore downstream of the modulator. The mud flow can lubricate (and cool) the motor while also being used in conjunction with a modulator to transmit signals through mud pulse telemetry.

Pressure sensors can be located in the modulator flow path of the conductive fluid. In at least one embodiment, pressure sensors can measure a differential pressure upstream and downstream of the modulator valve 12. For example, an upstream pressure sensor 70 can be located in the modulator upstream of the valve rotor 20, and a downstream pressure sensor 72 can be located in the modulator downstream of the valve rotor 20. Using this differential pressure, controls can adaptively compensate for variations in flow rate and mud weight and adjust the oscillating angle (if applicable), duration of rotation, and other variables. Controlling the variables allows better control of the modulator response and the ability to produce the prescribed differential pressure amplitude for the pressure wave.

FIG. 2 is a schematic longitudinal cross sectional view of another embodiment example of a system having a modulator with an electric motor according to the present invention coupled with a continuous wave modulator valve. This embodiment is similar to the embodiment of FIG. 1, except there is no motor housing outlet for the conductive fluid to flow out of the motor. Instead, this embodiment includes a pressure balance port 64. The conductive fluid can flow into the motor in an initial start-up of the electric motor. The conductive fluid can flood the interstitial spaces inside the motor, such as between the motor stator and motor rotor, with the conductive fluid until pressure inside the motor is balanced against pressure outside the motor, such as in the mud flow path 56. At that time, the flow through the pressure balance port is minimal or zero. The internal surfaces of the electric motor are still bathed in mud, yet are not short-circuited from contact with the mud due to the non-conductive hardened coating. If a condition occurs that unbalances the pressure, then the flow in or out of the motor could resume until the pressure is again balanced between the internal volume of the motor and the space external to the motor. An example of the unbalancing condition would be a seepage path, such as a controlled seepage path, out of the motor. Seepage through the seepage path could lower the pressure inside the electric motor and allow additional mud into the inner spaces of the modulator until the pressure balance is again restored.

FIG. 3 is a schematic transverse cross sectional view through the valve showing a valve rotor partially aligned with a valve stator for a partially open flow channel through the valve. FIG. 4 is a schematic transverse cross sectional view through the valve showing the valve rotor fully aligned with the valve stator for a fully open flow channel through the valve. As described in reference to FIG. 1 and FIG. 2, the motor rotor 40 of the motor 26 rotates the driveshaft 32, which in turn is rotationally coupled to the valve rotor 20. The rotation (including back and forth oscillation) of the valve rotor 20 periodically aligns the valve rotor flow openings 22 with the valve stator flow openings 18. The periodic alignment causes a change in the mud flow through the system. The actuation of the motor and periodic alignment of the flow openings can thus create pulses or a modulated pressure wave in the mud flow that can be sensed as mud telemetry signals through the system.

In at least one embodiment, the valve rotor 20 can oscillate in its rotation back and forth relative to the valve stator 16 described above, rather than a continuous rotation, and still produce a relatively continuous pressure wave if desired. An oscillator embodiment can improve anti-jamming issues, because debris naturally flows through the valve stator flow openings 18 and the valve rotor flow openings 22 as the openings are not entirely closed during the oscillations. The oscillating or other rotating motion of the motor rotor may help to sweep out a build-up of mud (known as "mud cake") and accelerate the mud flow passing through the gap between the modulator valve stator and valve rotor resulting in better lubrication of the bearings for the embodiment of FIG. 1 that provides a motor housing outlet. The valve rotor 20 can oscillate against the valve stator that can alternatively block and allow the mud to flow through the corresponding openings to create a continuous pressure wave, which may be modulated with Quadrature Phase Shift Keying (QPSK) or a similar modulation technique.

FIG. 5 is a schematic transverse cross sectional view through the motor showing flow channels for mud to flow around the electric motor. The motor 26 is illustrated mounted within the modulator housing 4 and having a housing 28. One or more peripheral openings 34 can be formed between an outer portion of the motor housing 28 and the inner diameter of the modulator housing 4 to allow mud to flow therethrough. Further, mud can flow between an interface of the motor's stator 36 and the motor rotor 40. When available, longitudinal grooves 58, described in reference to FIG. 1, formed between teeth in an inner circumferential surface of the motor stator 36 or outer circumferential surface of the motor rotor 40 can also provide a flow path for mud through the motor. Additional flow paths and description are provided in the schematics of FIGS. 6 and 7.

FIG. 6 is a schematic transverse cross sectional view through the electric motor showing an electric termination block for the electric motor. The wire connection module 50 can be disposed in the motor housing 28 and be coupled to wiring for operation of the motor such to motor windings.

FIG. 7 is a schematic transverse cross sectional view through the electric motor showing aspects of a mud flow path through the electric motor between the motor stator and motor rotor. Generally, the motor stator 36 is formed with a metal frame that is wound with multiple windings 52 around posts of the frame with a conductive material such as copper, as is traditionally used for motor design. A portion of the windings is illustrated with the understanding of those in the art that the windings would extend around the stator to complete the circle in the illustrated cross section. Terminations 98 of the windings can be coupled, for example, to the wire connection module shown in FIGS. 1 and 2, and electrically coupled to power wires and circuitry. The windings respond to an electrical current flowing through them to create a magnetic field. The magnetic field causes the motor rotor to rotate without electric contact between the motor stator and the motor rotor to produce rotational torque to drive the modulator valve rotor or other device. Aspects of general motor design and theory are well known to those on the field and the statements regarding motor design herein are not intended to provide full design details but rather to provide context as suitable for the invention.

The windings are insulated from the metal frame, but open along with their terminations to ambient conditions, including conductive fluids present in the electric motor that can short-circuit the electric motor. In this embodiment, the windings and their terminations have a nonconductive coating 66A to avoid short-circuiting when bathed in a conductive fluid. The conductive fluid can flow into the motor without short-circuiting the motor during operation. Other electrical components that are subject to short-circuit can likewise be coated.

In other embodiments, the motor rotor 40 can have windings (not shown) with their terminations that likewise are subject to short-circuiting. Such windings and their terminations can have a nonconductive coating sufficient to avoid short-circuiting. Similarly, the conductive fluid can flow into the motor without short-circuiting the motor during operation. In some embodiments, both the motor stator and motor rotor can have windings. In such embodiments, both sets of windings for the motor stator and motor rotor can have a nonconductive coating to avoid short-circuiting.

The motor stator 36 is formed with teeth 38 and the motor rotor 40 is formed with teeth 41. The teeth 38 in the motor stator 36 are generally separated from adjacent teeth by a stator tooth gap 62A. The tooth gaps 62A around the inner circumference of the motor stator extend longitudinally and form the longitudinal grooves 58 illustrated in FIGS. 1 and 2. In this embodiment, the stator tooth gap 62A can have an insert of a rare earth magnet to increase efficiency, which results in an inner circumference of the motor stator that is relatively smooth. In other embodiments without the inserts, the tooth gap 62A can be filled with the nonconductive coating to create a smooth inner circumference. In other embodiments, the tooth gap 62A may not be filled and can form an additional path for the conductive fluid to flow between the motor stator and the motor rotor for cooling and lubrication.

Similarly, the motor rotor 40 is formed with teeth 41. The teeth 41 in the motor rotor 40 are generally separated from adjacent teeth by a tooth gap 62B. The tooth gaps 62B around the outer circumference of the motor rotor extend longitudinally as seen in FIGS. 1 and 2 and form longitudinal grooves 58 in the motor rotor. As described above, longitudinal grooves 58 formed between teeth in the outer circumferential surface of the motor rotor 40 can provide a flow path for mud through the motor. Mud flowing through the motor in the stator-rotor gap 60 can also flow in the longitudinal grooves and provide additional cooling surfaces, lubrication, and possible flushing through of any solids or fine particles in the mud flow stream. In some embodiments, the tooth gaps 62B can be filled with a nonconductive coating 66B, as illustrated in one tooth gap.

The coating is generally thick, sufficient to seal the portions of the motor stator and/or motor rotor to avoid short-circuiting in the presence of a conductive fluid. The coating can be abrasive resistant and composed of, for example, a resin coating, such an epoxy or phenolic, or other suitable hardened nonconductive material, so that the coating becomes a component of the motor stator and/or motor rotor. The conductive fluid can flow over and around the motor stator without short-circuiting.

Adaptive Control to Eliminate Flow Kit

A flow kit in a conventional design is used to adjust the bypass flow area when the valve rotor is fully closed. A flow kit may have to be adjusted prior to each job based on a predetermined range of flow rates being used for drilling. Thus, eliminating the flow kit can improve the automation, de-skill the operator, and reduce the operational cost. The following techniques may help to reduce or even eliminate the flow kits.

1) Use a mechanical physical stop to prevent the flow area from being completely closed or design the valve rotor to be smaller than the fully opened flow area. This embodiment can prevent the valve rotor from completely from blocking the flow area.
2) Use pressure sensors, as described above, to measure differential pressure in internal volumes of the modulator and adaptively adjust the oscillating angle to achieve the prescribed differential pressure amplitude, regardless of the flow rate and mud weight. Another benefit of using the differential pressure measurement embodiment is to prevent system damage due to high thrust forces.
3) Designing the shape of valve stator opening and valve rotor such that during the high flow drilling, the oscillation can be on one side of the fully open position and during the low flow the oscillations are restricted to the other side of the open position.

A trade-off is between a small oscillating angle that is desired to minimize the inertial torque, and a large oscillating angle that benefits the phase accuracy. Generally, the oscillating angle needs to the adjusted at different flow rates. Even if the oscillating angle is sufficiently large at low flow rate, it will be smaller at high flow rate in order to achieve the prescribed differential pressure amplitude.

Torque Estimation for Rotor

The following equation can be used to describe torque components acting on the valve rotor, $$T_m = J\ddot{\theta} + T_f + T_q \quad (1)$$

where:
- J=polar moment of inertia (kg-m$^2$) of the valve rotor (and small components used to attach to shaft)
- $\theta$=rotor shaft angle
- $T_m$=motor drive torque
- $T_g$=fluidic torque due to mud flow
- $T_f$=torque due to friction of the thrust bearing The torque from a "parking magnet" is not included in the above equation. An oscillator design can use a mechanical physical stop to prevent the flow area from being completely closed or design the valve rotor to be smaller than the fully opened flow area. Therefore, the "parking magnet" is not necessary for an oscillator design.

Siren Based Mud Modulator Fluid Dynamic Model

FIG. 8 is a diagram of an analytic mud modulator fluid dynamic model. The following analysis establishes a relationship between torque, modulation frequency, pressure waveform signal phase path, and the power requirements.

Let $A_0$ be the flow area when fully open and $\theta_0$ is the corresponding shaft angle. Define $\theta$ to be the shaft angle that the valve rotor blocks the flow area, A be the corresponding flow area, and $\overline{A}$ be the flow area that is blocked by rotor. Let D be the collar ID, and $$\Phi = \pi\left(\frac{D}{2}\right)^2$$

be the cross-section of collar ID. The, the result is:

$$A = A_0 - \overline{A} \quad (2)$$

The fluid dynamic theory shows the volumetric flow Q through an orifice can be written as:

$$Q = CA\sqrt{\frac{2}{\rho}\Delta P} \quad (3)$$

where:
- Q=volumetric flow rate, m$^3$/s
- C=flow coefficient, dimensionless
- $\rho$=fluid density, kg/m$^3$
- A=flow area, m$^2$
- $\Delta P$=pressure difference between the upstream and downstream of the orifice, Pa.

Flow coefficient is defined as:

$$C = \frac{C_d}{\sqrt{1 - \left(\frac{A}{\Phi}\right)^2}} \quad (4)$$

where:
$C_d$=Discharge coefficient, dimensionless, typically between 0.6 and 0.85, depending on the orifice geometry. Define dP as the differential pressure changed when the flow area is changed from $A_0$ to A. Therefore, the result is:

$$\Delta P = \frac{\rho}{2}\left(\frac{Q}{CA}\right)^2 \quad (5)$$

$$\Delta P_0 = \frac{\rho}{2}\left(\frac{Q}{C_0 A_0}\right)^2 \quad (6)$$

$$dP = \Delta P - \Delta P_0 = \frac{\rho}{2}\left(\frac{Q}{C_0 A_0}\right)^2\left(\frac{C_0^2 A_0^2}{C^2 A^2} - 1\right) = \Delta P_0\left(\frac{C_0^2 A_0^2}{C^2 A^2} - 1\right) \quad (7)$$

From Eq (7), the result can be defined as $$\tilde{A} = CA = \frac{C_0 A_0}{\sqrt{\frac{dP}{\Delta P_0} + 1}} \quad (8)$$

Combining Eq (8) into EQ (4) results in the flow area A as function of dP by the following:

$$A(dP) = \frac{\Phi}{\sqrt{\left(\frac{C_d \Phi}{\tilde{A}}\right)^2 + 1}} = \frac{\Phi}{\sqrt{\left(\frac{C_d \Phi}{C_0 A_0}\right)^2\left(\frac{dP}{\Delta P_0} + 1\right) + 1}} \quad (9)$$

FIG. 9 is a diagram of an analytic model to calculate an effective radius for an applied thrust load on a thrust bearing for the modulator.

Friction Torque

Torque due to friction of the thrust bearing and is given by:

$$T_f = \mu r F_g \quad (10)$$

where:
- $\mu$=coefficient of friction (0.1 or less for diamond bearings)
- r=effective radius to the applied thrust load
- $F_g$=fluidic thrust force due to mud flow.

The friction torque and effective radius may be calculated by following.

$$dT_f = \mu r dF_g = 2\pi\mu\frac{F_g}{\pi(r_1^2 - r_0^2)}r^2 dr \quad (11)$$

$$T_f = \int_{r_0}^{r_1} 2\pi\mu\frac{F_g}{\pi(r_1^2 - r_0^2)}r^2 dr \quad (12)$$

$$= \frac{2}{3}\mu F_g \frac{r_1^3 - r_0^3}{r_1^2 - r_0^2}$$

Then, the effective radius is given as:

$$r = \frac{2}{3}\frac{r_1^3 - r_0^3}{r_1^2 - r_0^2} \quad (13)$$

If $r_0=0$, EQ (13) can be simplified as:

$$r = 2/3\, r_1 \qquad (14)$$

The fluidic thrust force $F_g$ can be written as:

$$F_g = \Delta \overline{PA} = (\Delta P_0 + dP)(A_0 - A) \qquad (15)$$

Fluidic Torque

FIG. 10 is a diagram to illustrate laminar shear of fluid between the rotor and stator of the electric motor. The fluidic torque $T_g$ may include many components. When the motor rotor 40 referenced in FIG. 1 rotates, there exists a friction torque known as viscous friction torque due to the viscosity of the mud between motor rotor 40 and stator 36. When mud jets out from an orifice, there exists a tangential change of momentum, which reflects a torque preventing the rotor rotation. It is known as steady state flow torque. If the valve rotor is angularly accelerated, the mud between rotor blades is also accelerated synchronously and a torque is produced to meet the acceleration. This is known as transient flow torque.

1) Viscous Friction Torque $T_v$

Viscous friction torque is resistance torque that is caused by the viscosity of the working medium. Due to the small clearance, such as $\delta \leq 2$ mm, between the valve stator and rotor, the working medium between the layers is considered to be laminar incompressible Newtonian fluid, and the shear stress, $\tau$, is proportional to the velocity gradient, $\partial u/\partial r$, in the direction perpendicular to the layers. Since the valve stator and rotor are concentric, the viscous friction torque is given as:

$$\tau = \mu_v \frac{\partial u}{\partial r} \qquad (16)$$

$$u = \omega R \qquad (17)$$

$$\frac{\partial u}{\partial r} = \frac{\omega R}{\delta} \qquad (18)$$

$$T_v = \tau R A_{sr} = 2\pi \mu_v \frac{R^2 L_{sr}}{\delta} \omega \qquad (19)$$

where,
$\mu_v$=coefficient
$A_{sr}$=contact area between stator and rotor
$L_{sr}$=contact length between stator and rotor.

Steady State Flow Torque $T_{sf}$

Theoretically, the direction of the steady state flow force is perpendicular to the flow area A and points to the axis of rotor (and tool axis). Therefore, the steady state flow torque is zero theoretically:

$$T_{sf} = 0 \qquad (20)$$

However, if the valve rotor blade has a bevel edge, the flow direction deviates from the axis of rotor by a jet angle $\varphi$. Following the conservation of momentum, the flow induced torque acting on rotor can be written as:

$$T_{sf}\, dt = I_F \omega_F \qquad (21)$$

$$I_F = \frac{1}{2}\rho (Q dt)\left(\frac{D}{2}\right)^2 \qquad (22)$$

$$\omega_F = \frac{Q}{A}\sin \varphi \qquad (23)$$

where,
$I_F$=inertia of the flow
$\omega_F$=angular velocity of the flow
Therefore, the result is:

$$T_{sf} = \frac{\rho Q^2 D^2}{8A}\sin\varphi \qquad (24)$$

Transient Flow Torque $T_{tf}$

If the valve rotor is angularly accelerated, the mud between the valve rotor flow openings 22 is also accelerated synchronously and a torque is produced to meet the acceleration. The transient flow torque can be written as:

$$T_{tf} = J_{rb}\ddot{\theta} \qquad (25)$$

where,
$J_{rb}$=inertia of flow between rotor blades.
Combined, the fluidic torque $T_g$ can be written as:

$$T_g = T_v + T_{sf} + T_{tf} \qquad (26)$$

Torque Requirements Simulation (Tool Size=6.75")

FIG. 11 is a diagram to illustrate an analytic simulation model for torque requirements upon the electric motor to operate the modulator as an oscillator (stator/rotor). For present purposes, the MWD bit rate is modelled at 6 bps, which can be achieved with a QPSK modulation at 6 Hz using three symbols/sec. The torque requirements are simulated on a 6.75" tool based on the analytic model detailed above.

To simulate the fluidic torque, the flow jet angle is assumed at 10°. To simulate the inertial torque, the values of the motor stator OD=1.34" and length L=12" are assumed. Based on inventor experience, these assumptions are believed to be realistic and on the conservative side.

FIG. 12A is a chart to illustrate exemplary maximum torque and average power requirement vs. flow rate at a first mud density. FIG. 12B is a chart to illustrate exemplary maximum torque and average power requirement vs. flow rate at a second greater mud density. For this embodiment, the conclusion is that:
1) Maximum torque<3 Nm
2) Average power<2 W (exclude the power supply efficiency and other subsystems such as controller etc.)

The above requirements are for design reference only. Computer fluid dynamics (CFD) simulation may result in estimations that are more accurate. However, it is not expected that the CFD simulation will be significantly different from the above analytic results.

FIG. 13A is a chart to illustrate exemplary oscillation angle vs. flow rate at a first mud density. FIG. 13B is a chart to illustrate exemplary oscillation angle vs. flow rate at a second greater mud density. Notice that:
1) At low flow rate, in order to achieve 400 psi differential pressure, a larger oscillation angle is required, and thus results larger fluidic trust and friction torque.
2) $\theta_0$ represents how much of flow area is blocked by oscillator stator. The more flow area is blocked by oscillator stator ($\theta_0$ smaller), the less oscillation angle is required, and thus results in less fluidic trust and friction torque. However, the flow rate is increased and results more severe erosion of oscillator stator and rotor.

FIG. 14A is a chart to illustrate exemplary maximum friction torque vs. flow rate at a given mud density. FIG. 14B is a chart to illustrate exemplary maximum fluidic torque vs. flow rate for such given mud density. It is clear that:

1) Friction torque decreases as flow rate increases
2) Fluidic torque increases as flow rate increases.
3) At low flow rate, the friction torque is the dominating factor.
4) At high flow rate, the fluidic torque is the dominating factor.

FIG. 15A is a chart to illustrate exemplary oscillation angle vs. differential pressure at a first flow rate. FIG. 15B is a chart to illustrate exemplary oscillation angle vs. differential pressure at a second greater flow rate. There is a complex relationship between pressure and shaft angle. To generate a sinusoidal differential pressure signal, the oscillation angle may not necessarily be sinusoidal, as shown in the FIGS. 15A and 15B. This is particularly true at low flow rate, which results in a larger inertial torque at the low flow rate.

FIG. 16A is a chart to illustrate exemplary torque contribution vs. time at a first flow rate. FIG. 16B is a chart to illustrate exemplary torque contribution vs. time at a second greater flow rate. The charts show that:
1) At low flow rate, the inertial torque and friction torque may contribute to a larger portion of overall torque required;
2) At high flow rate, the fluidic torque is the dominating factor; and
3) The inertial torque is largest while the fiction torque and fluidic torque are at a minimum. This beneficial feature helps to reduce the maximum torque requirements.

FIG. 17A is a chart to illustrate exemplary power vs. time at a first flow rate. FIG. 17B is a chart to illustrate exemplary power vs. time at a second greater flow rate. The charts show that:
1) When the fiction torque and fluidic torque are at maximum, the angle velocity is minimal, thus the power requirement is advantageously low; and
2) The instance power demand may be higher at low flow rate than at high flow rate. However, in this embodiment, the maximum instance power demand is less than 10 W.

FIG. 18 is a schematic of another embodiment having a modulator located uphole for a downlink in a wellbore. The modulator 2A can be used in various places in an oil field environment. In some embodiments, the modulator can be used downhole such as with a bottom hole assembly (BHA) described in the Background where the pressure waves as signals are sent uphole, generally to a surface mounted processor. In the embodiment of FIG. 18, the modulator 2B can be located uphole relative to the BHA and specifically the modulator 2A can send pressure waves downhole as signals to the BHA or other equipment generally in the wellbore. "Uphole" means that the modulator 2B is at a shorter distance from the surface than the BHA or the modulator 2A. "Uphole" further can also mean on the surface of the well, such as ground level or adjacent the surface. For example, an oilrig 76 generally is used to drill a hydrocarbon well 78 to establish a wellbore 80. A drill string 82 of pipe and tooling is progressively inserted into the wellbore as drill bits progressively deepen the wellbore. A mud pump 90 pumps mud 88 from a mud pit 86 through an inlet conduit 92A to an inlet connection 94 through a rotary steerable tool (shown in FIG. 19) to the drill string 82 to travel downward through the drill string and through the BHA with a drill bit to help flush cuttings from the drill bit. The mud pressure causes the mud to return up an annulus between the larger wellbore and the small drill string to the surface and into a return conduit 92B. The mud flows over a screen 96 to separate larger particles and returns to the mud pit 86. A bypass conduit 92C is fluidically coupled to the inlet conduit 92A. The modulator 2B is fluidically coupled to the bypass conduit 92C. Mud flowing through the modulator is returned to the mud pit 86.

When the valve rotor is positioned over the valve stator flow openings and no flow occurs, the flow from the mud pump through the inlet conduit 92A down to the BHA is at full flow for a given pump output. However, when the modulator is at least partially open by aligning at least partially the valve rotor openings with the valve stator openings, a portion of the mud flow through the inlet conduit 92A is diverted through the modulator. The pressure drops and creates a pulse, By controlling the rotation as described herein, a pressure wave is created to flow downhole and create a downlink communication with the BHA 84 or other downhole equipment. A modulator 2A, if positioned downhole, can send pressure waves uphole in response to the modulator 2B pressure waves sent downhole. The modulator 2B is illustrated on the surface, but can be located subsurface as well, while being uphole relative to the modulator 2A.

FIG. 19 is a schematic of another embodiment having the motor as a component in a rotary steering tool. The electric motor 26 described herein can be used in multiple embodiments, particularly when conductive fluids are flowing around a typical electric motor and seals are needed to keep the conductive fluid out of the electric motor. In this embodiment, a rotary steering tool 100 uses mud to guide a drilling angle in a wellbore. The electric motor 26 of the present invention can allow the mud to flow into the motor without short-circuiting. Actuators (such as the illustrated flow distributor) coupled to the electric motor 26 can divert mud flow to actuate a laterally extending pad 102 to push the drilling to an angle.

FIG. 20 is a schematic of another embodiment having the motor as a component in a formation coring tool. The electric motor 26 can also be used in a formation coring tool 110. When the formation coring tool is at a selected depth in the wellbore, the tool is actuated to extend lateral rods 112 to push the drill string 82 toward a wellbore wall. The electric motor 26 of the present invention can allow formation fluid to flow into the motor without short-circuiting the motor. The electric motor 26 can extend a coring bit 114 and drill in the formation of the wall to extract a core. The core can be stored and later retrieved when uphole.

Other and further embodiments utilizing one or more aspects of the inventions described above can be devised without departing from the disclosed invention as defined in the claims. For example, other embodiments can include other shapes and types of inlet housings, valve stators, valve rotors, motors, motor stators, motors rotors, wiring placement through various electrical passages, the motor can be separated from the modulator valve and used for other purposes, and other variations than those specifically disclosed above within the scope of the claims.

The invention has been described in the context of preferred and other embodiments and not every embodiment of the invention has been described. Modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A downhole tool, comprising:
an electric motor, comprising:
an electric motor rotor and an electric motor stator disposed circumferentially with the electric motor rotor; and at least one of the motor stator and motor rotor comprising an electric motor winding and a termination for the winding, the winding and termination having a nonconductive coating;
wherein the electric motor is configured to allow a conductive liquid to contact the electric motor rotor and the electric motor stator without short-circuiting the electric motor; and
wherein the electric motor is powered by downhole power supply and is a component of the downhole tool.

2. The downhole tool of claim 1, further comprising a motor housing having at least one inlet port and at least one outlet port configured for the conductive fluid to flow through the electric motor in contact with the motor rotor and the motor stator.

3. The downhole tool of claim 1, further comprising a motor housing having an inlet port configured for the conductive fluid to flow into the electric motor and to create a pressure balance of the conductive fluid within the electric motor compared to the conductive fluid outside the electric motor.

4. The downhole tool of claim 1, further comprising a motor housing with a flow path through the motor configured to allow the conductive fluid to seep into the motor.

5. The downhole tool of claim 1, wherein at least portions of the at least one of the motor stator and motor rotor in addition to the electric motor winding and termination comprise the nonconductive coating.

6. The downhole tool of claim 1, wherein the modulator comprises a valve coupled to the motor and configured to produce a pressure wave for telemetry from rotation of the motor.

7. The downhole tool of claim 6, wherein the valve comprises a valve rotor and the motor comprises a stepper motor or a servo motor coupled to the valve rotor independently of a gearbox.

8. The downhole to of claim 6, wherein the modulator comprises a valve stator with valve stator flow openings and a valve rotor with valve rotor flow openings, and the valve rotor is configured to rotate relative to the valve stator to periodically align the valve rotor flow openings with the valve stator flow openings to allow a first flow of the conductive fluid through the modulator and periodically misalign the valve rotor flow openings with the valve stator flow openings to disallow the first flow of the conductive fluid to create a pressure wave in the conductive fluid flowing through the modulator.

9. The downhole tool of claim 8, wherein the valve rotor rotation relative to the valve stator is a continuous rotation.

10. The downhole tool of claim 8, wherein the valve rotor rotation relative to the valve stator is an oscillation rotation.

11. The downhole tool of claim 8, further comprising at least two pressure sensors in fluid communication with the conductive fluid, wherein at least one pressure sensor is positioned upstream of the valve rotor and at least one pressure sensor is positioned downstream of the valve rotor.

12. The downhole tool of claim 11, further comprising a controller coupled to the at least two pressure sensors and configured to adjust the rotation of the valve rotor to achieve at least one of a prescribed differential pressure amplitude and wave form.

13. The downhole tool of claim 6, wherein the pressure wave is modulated in accordance with at least one of phase-shift keying (PSK), frequency-shift keying (FSK), and amplitude-shift keying (ASK) to transmit data.

14. The downhole tool of claim 6, further comprising the modulator as a first modulator positioned downhole and a second modulator positioned uphole of the first modulator, and wherein the first modulator is configured to communicate pressure wave signals to a processor uphole of the first modulator and the second modulator is configured to communicate pressure wave signals to a processor downhole of the second modulator.

15. The downhole tool of claim 1, wherein the electric motor is a component in a rotary steerable tool.

16. The downhole tool of claim 1, wherein the electric motor is a component in a formation coring tool.

17. The downhole tool of claim 1, wherein the electric motor is a component in a telemetry modulator.

18. A method of operating a downhole tool comprising an electric motor as a component of the downhole tool and having an electric motor rotor and an electric motor stator disposed circumferentially with electric motor rotor, and at least one of the motor stator and motor rotor comprising an electric motor winding and a termination for the winding, the winding and termination having a nonconductive coating, the method comprising:
flowing a conductive liquid into contact with the electric motor stator and the electric motor rotor while operating the electric motor with power from a downhole power supply without short circuiting the electric motor.

19. The method of claim 18, further comprising allowing the conductive fluid to flow into the electric motor in contact with the at least one of the motor rotor and motor stator and creating a pressure balance of the conductive fluid in the electric motor compared to the conductive fluid outside the electric motor.

20. The method of claim 18, further comprising allowing the conductive fluid to flow into the electric motor in contact with the at least one of the motor rotor and motor stator and allowing the conductive fluid to seep out of the electric motor.

21. The method of claim 18, wherein the modulator comprises a valve coupled to the electric motor and further comprising producing a pressure wave for telemetry from rotation of the electric motor.

22. The method of claim 21, wherein the electric motor comprises a stepper motor or a servo motor and further comprising coupling the stepper motor or a servo motor to the valve independently of a gearbox.

23. The method of claim 21, wherein the modulator comprises a valve stator with valve stator flow openings and a valve rotor with valve rotor flow openings and further comprising generating a pressure wave by rotating the valve rotor relative to the valve stator to periodically align the valve rotor flow openings with the valve stator flow openings to allow a first flow of the conductive fluid through the modulator and periodically misalign the valve rotor flow openings with the valve stator flow openings to disallow the first flow of the conductive fluid to create a pressure wave in the conductive fluid flowing through the modulator.

24. The method of claim 23, further comprising rotating the valve rotor in a continuous rotation.

25. The method of claim 23, further comprising rotating the valve rotor in an oscillating rotation.

26. The method of claim 23, further comprising measuring an upstream pressure relative to the valve rotor and measuring a downstream pressure relative to the valve rotor.

27. The method of claim 26, further comprising determining a difference between the upstream pressure and the downstream pressure and adjusting the rotation of the valve rotor to achieve a prescribed differential pressure amplitude.

28. The method of claim 21, further comprising modulating the pressure wave in accordance with at least one of phase-shift keying (PSK), frequency-shift keying (FSK), and amplitude-shift keying (ASK) to transmit data.

29. The method of claim 21, further comprising the modulator as a first modulator positioned downhole and a second modulator positioned uphole of the first modulator, and further comprising communicating pressure wave signals from the first modulator to a processor uphole of the first modulator and communicating pressure wave signals from the second modulator to a processor downhole of the second modulator.

* * * * *